US012641679B2

(12) United States Patent
Choi et al.

(10) Patent No.: US 12,641,679 B2
(45) Date of Patent: May 26, 2026

(54) ELECTRONIC APPARATUS AND OPERATING METHOD FOR MANAGING WIRELESS CONNECTIONS BY BANDWIDTH ASSESSMENT AND SELECTIVE DISCONNECTION

(71) Applicant: SAMSUNG ELECTRONICS CO., LTD., Suwon-si (KR)

(72) Inventors: Kilsoo Choi, Suwon-si (KR); Sehyun Kim, Suwon-si (KR); Hyeeun Park, Suwon-si (KR); Yongwoo Shin, Suwon-si (KR); Jongin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 295 days.

(21) Appl. No.: 18/378,502

(22) Filed: Oct. 10, 2023

(65) Prior Publication Data

US 2024/0049350 A1      Feb. 8, 2024

Related U.S. Application Data

(63) Continuation of application No. PCT/KR2023/008942, filed on Jun. 27, 2023.

(30) Foreign Application Priority Data

Jun. 28, 2022    (KR) ........................ 10-2022-0079240
Sep. 28, 2022    (KR) ........................ 10-2022-0123481

(51) Int. Cl.
*H04W 76/36*        (2018.01)
*H04W 4/80*         (2018.01)
(Continued)

(52) U.S. Cl.
CPC ........... *H04W 76/36* (2018.02); *H04W 76/10* (2018.02)

(58) Field of Classification Search
CPC ..... H04W 76/10; H04W 76/30; H04W 76/34; H04W 76/36; H04W 16/14; H04W 4/80; H04W 28/18
See application file for complete search history.

(56) References Cited

U.S. PATENT DOCUMENTS

| | | | |
|---|---|---|---|
| 7,218,644 B1 | 5/2007 | Heinonen et al. | |
| 10,630,348 B1 * | 4/2020 | Haynes | ................ H04B 7/2628 |

(Continued)

OTHER PUBLICATIONS

Extended European Search Report issued Mar. 27, 2025 by the European Patent Office for EP Patent Application No. 23831864.6.
(Continued)

*Primary Examiner* — Jenee Holland
(74) *Attorney, Agent, or Firm* — Sughrue Mion, PLLC

(57)                    ABSTRACT

An electronic device includes a processor configured to execute instructions to: receive a request for wireless connection from a first device, identify a usage of a wireless bandwidth of the first device, determine whether a wireless connection to the first device is possible based on a remaining wireless bandwidth of the electronic device and the usage of the wireless bandwidth of the first device, direct a user interface to be provided to allow a user to select at least one other wireless device of one or more other wireless devices on which other device wireless connection will be released, from among the one or more other wireless devices that are already wirelessly-connected to the electronic device with the other device wireless connection, release the other device wireless connection to the at least one other wireless device that is selected, and establish the wireless connection to the first device.

23 Claims, 21 Drawing Sheets

(51) Int. Cl.
| | | |
|---|---|---|
| *H04W 16/14* | (2009.01) | |
| *H04W 28/18* | (2009.01) | |
| *H04W 76/10* | (2018.01) | |

(56) References Cited

U.S. PATENT DOCUMENTS

| | | | | |
|---|---|---|---|---|
| 11,258,652 | B2 | 2/2022 | Rosenblatt et al. | |
| 2004/0224668 | A1* | 11/2004 | Shell | H04L 41/0886 |
| | | | | 455/552.1 |
| 2008/0205315 | A1* | 8/2008 | Park | H04W 76/34 |
| | | | | 370/310 |
| 2013/0012130 | A1 | 1/2013 | Grushkevich | |
| 2013/0308446 | A1* | 11/2013 | Muto | H04W 76/36 |
| | | | | 370/230 |
| 2014/0220885 | A1* | 8/2014 | Chou | H04W 4/80 |
| | | | | 455/41.1 |
| 2014/0323049 | A1* | 10/2014 | Park | H04W 4/80 |
| | | | | 455/41.2 |
| 2015/0156808 | A1* | 6/2015 | Brantner | H04W 8/005 |
| | | | | 455/41.2 |
| 2016/0360558 | A1* | 12/2016 | Vangala | H04W 52/0209 |
| 2017/0118767 | A1* | 4/2017 | Lee | H04W 4/80 |
| 2018/0124842 | A1* | 5/2018 | Debates | H04W 8/005 |
| 2018/0197501 | A1* | 7/2018 | Veeramani | H04N 21/43635 |
| 2018/0234419 | A1* | 8/2018 | Yamamoto | H04W 4/80 |
| 2019/0021133 | A1* | 1/2019 | Vandenheste | H04L 63/0428 |
| 2019/0306902 | A1* | 10/2019 | Debates | G06V 10/75 |
| 2019/0379669 | A1 | 12/2019 | Arora et al. | |
| 2020/0037391 | A1* | 1/2020 | Cui | H04W 76/38 |
| 2020/0100218 | A1* | 3/2020 | Douglas | H04W 88/04 |
| 2020/0137542 | A1 | 4/2020 | Jung et al. | |
| 2021/0232409 | A1* | 7/2021 | Vetter | G06F 9/451 |
| 2021/0274416 | A1* | 9/2021 | Jendli | H04W 88/06 |
| 2021/0377706 | A1* | 12/2021 | Lekutai | H04W 4/06 |
| 2021/0400456 | A1* | 12/2021 | Knaappila | H04W 4/80 |
| 2022/0167456 | A1* | 5/2022 | Jia | H04W 24/04 |
| 2023/0308997 | A1* | 9/2023 | Nishida | G01S 1/08 |
| 2024/0049350 | A1* | 2/2024 | Choi | H04W 16/14 |

OTHER PUBLICATIONS

Communication issued Sep. 12, 2025 by the European Patent Office in European Patent Application No. 23831864.6.

\* cited by examiner

FIG. 2

EXAMPLE OF BANDWIDTH REQUIRED FOR
EACH FUNCTION/MANUFACTURER OF BLUETOOTH DEVICE

| ITEMS | OPERATION | SLOT |
|---|---|---|
| BACKGROUND | PAGE SCANNING | 36 |
| | INQUIRY SCANNING | 18 |
| | ADVERTISING | 4 |
| A2DP | 195 kbps DATA | 24 |
| | 237 kbps DATA | 24 |
| BLUETOOTH REMOTE CONTROLLER | | 2 |
| HID | KEYBOARD | 6 |
| | MOUSE | 6 |
| | GAME CONTROLLER (MANUFACTURER A) | 6 |
| | GAME CONTROLLER (MANUFACTURER B) | 6 |
| | GAME CONTROLLER (MANUFACTURER C) | 8 |
| | GAME CONTROLLER (MANUFACTURER D) | 12 |

FIG. 6

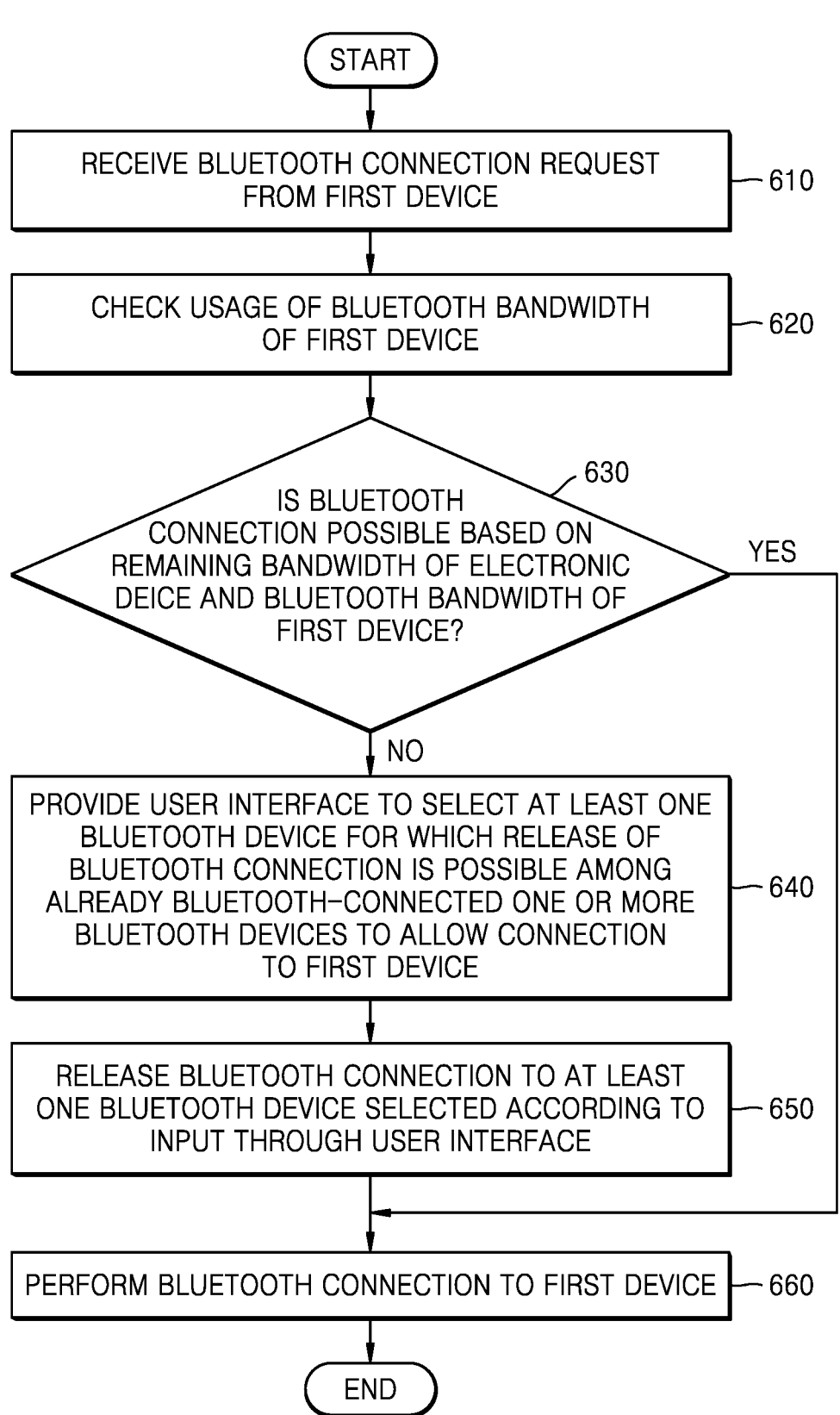

START

RECEIVE BLUETOOTH CONNECTION REQUEST FROM FIRST DEVICE — 610

CHECK USAGE OF BLUETOOTH BANDWIDTH OF FIRST DEVICE — 620

IS BLUETOOTH CONNECTION POSSIBLE BASED ON REMAINING BANDWIDTH OF ELECTRONIC DEICE AND BLUETOOTH BANDWIDTH OF FIRST DEVICE? — 630

YES

NO

PROVIDE USER INTERFACE TO SELECT AT LEAST ONE BLUETOOTH DEVICE FOR WHICH RELEASE OF BLUETOOTH CONNECTION IS POSSIBLE AMONG ALREADY BLUETOOTH-CONNECTED ONE OR MORE BLUETOOTH DEVICES TO ALLOW CONNECTION TO FIRST DEVICE — 640

RELEASE BLUETOOTH CONNECTION TO AT LEAST ONE BLUETOOTH DEVICE SELECTED ACCORDING TO INPUT THROUGH USER INTERFACE — 650

PERFORM BLUETOOTH CONNECTION TO FIRST DEVICE — 660

END

BANDWIDTH INFORMATION FOR EACH BLUETOOTH DEVICE

| DEVICE IDENTIFICATION INFORMATION | SLOT |
|---|---|
| FIRST DEVICE | 18 |
| SECOND DEVICE | 12 |
| THIRD DEVICE | 2 |
| FOURTH DEVICE | 6 |

BANDWIDTH INFORMATION FOR EACH MANUFACTURER OF BLUETOOTH DEVICE

| DEVICE IDENTIFICATION INFORMATION | MANUFACTURER IDENTIFICATION INFORMATION | SLOT |
|---|---|---|
| FIRST DEVICE | FIRST MANUFACTURER | 16 |
| | SECOND MANUFACTURER | 12 |
| | THIRD MANUFACTURER | 16 |
| | FOURTH MANUFACTURER | 18 |

BANDWIDTH INFORMATION FOR EACH FUNCTION OF BLUETOOTH DEVICE

| DEVICE IDENTIFICATION INFORMATION | FUNCTION IDENTIFICATION INFORMATION | SLOT |
|---|---|---|
| FIRST DEVICE | FIRST FUNCTION | 16 |
| | SECOND FUNCTION | 12 |
| | THIRD FUNCTION | 16 |

LIST OF CONNECTED BLUETOOTH DEVICE

| BLUETOOTH DEVICE | CONNECTION POINT IN TIME |
|---|---|
| BLUETOOTH SOUND BAR | 42 HOURS AGO |
| BLUETOOTH MIKE | 20 HOURS AGO |
| GAME CONTROLLER 1 | 14 HOURS AGO |
| GAME CONTROLLER 2 | 3 HOURS AGO |
| GAME CONTROLLER 3 | 2 HOURS AGO |

BLUETOOTH CONNECTED DEVICE LIST

| BLUETOOTH DEVICE | RELEVANCE TO GAME APPLICATION |
|---|---|
| BLUETOOTH SOUND BAR | GAME RELEVANCE 50% |
| BLUETOOTH MIKE | GAME RELEVANCE 80% |
| GAME CONTROLLER 1 | GAME RELEVANCE 100% |
| GAME CONTROLLER 2 | GAME RELEVANCE 100% |
| GAME CONTROLLER 3 | GAME RELEVANCE 100% |

1420

BLUETOOTH CONNECTED DEVICE LIST

| BLUETOOTH DEVICE | RELEVANCE TO VIDEO APPLICATION |
|---|---|
| BLUETOOTH SOUND BAR | VIDEO APP RELEVANCE 100 % |
| BLUETOOTH MIKE | VIDEO APP RELEVANCE 20 % |
| GAME CONTROLLER 1 | VIDEO APP RELEVANCE 0% |
| GAME CONTROLLER 2 | VIDEO APP RELEVANCE 0% |
| GAME CONTROLLER 3 | VIDEO APP RELEVANCE 0% |

FIG. 17

1700
BLUETOOTH CONNECTED DEVICE LIST

| BLUETOOTH DEVICE | SUPPORT/NON-SUPPORT USB CONNECTION |
|---|---|
| BLUETOOTH SOUND BAR | NOT SUPPORT USB CONNECTION |
| BLUETOOTH MIKE | SUPPORT USB CONNECTION |
| GAME CONTROLLER 1 | NOT SUPPORT USB CONNECTION |
| GAME CONTROLLER 2 | SUPPORT USB CONNECTION |
| GAME CONTROLLER 3 | NOT SUPPORT USB CONNECTION |

BLUETOOTH CONNECTED DEVICE LIST

| BLUETOOTH DEVICE | CONNECTION POINT IN TIME |
|---|---|
| BLUETOOTH SOUND BAR | BANDWIDTH USAGE 25 |
| BLUETOOTH MIKE | BANDWIDTH USAGE 15 |
| GAME CONTROLLER 1 | BANDWIDTH USAGE 40 |
| GAME CONTROLLER 2 | BANDWIDTH USAGE 30 |
| GAME CONTROLLER 3 | BANDWIDTH USAGE 50 |

ELECTRONIC APPARATUS AND OPERATING METHOD FOR MANAGING WIRELESS CONNECTIONS BY BANDWIDTH ASSESSMENT AND SELECTIVE DISCONNECTION

CROSS-REFERENCE TO RELATED APPLICATIONS

This application is a by-pass continuation application of International Application No. PCT/KR2023/008942, filed on Jun. 27, 2023, which is based on and claims priority to Korean Patent Application Numbers 10-2022-0079240, filed on Jun. 28, 2022, and 10-2022-0123481, filed on Sep. 28, 2022, in the Korean Intellectual Property Office, the disclosures of which are incorporated by reference herein in their entireties.

TECHNICAL FIELD

Disclosed embodiments relate to an electronic device and an operating method thereof for performing wireless connection, and more particularly, to an electronic device and an operating method thereof for providing Bluetooth connections to a plurality of Bluetooth devices.

BACKGROUND

Bluetooth is a wireless communication protocol that uses UHF radio wave frequencies in a 2.4 GHz industrial, scientific, medical (ISM) band to allow various Bluetooth devices to connect wirelessly at a speed of about 1 Mbps, making a Bluetooth device discover and wirelessly access another Bluetooth device when the other Bluetooth device is present in its vicinity. Bluetooth is managed by the Bluetooth Special Interest Group (SIG). Bluetooth may be in accordance with the IEEE 802.15.1 standard, and derivatives thereof. A Bluetooth device is configured to use a Bluetooth device (BD) address set in another Bluetooth device and a Bluetooth device name input by the user for mutual recognition in a Bluetooth communication scheme, and send information to the other Bluetooth device. Hence, it is possible for the Bluetooth devices to communicate with each other without using a cable directly connected therebetween. Due to this convenience, the Bluetooth function has become popular, generalized, and is being widely used.

SUMMARY

An electronic device may include: a communicator; a memory configured to store one or more instructions; and a processor configured to execute the one or more instructions stored in the memory. The processor is configured to execute the one or more instructions to: receive a request for wireless connection from a first device, identify a usage of a wireless bandwidth of the first device, determine whether a wireless connection to the first device is possible based on a remaining wireless bandwidth of the electronic device and the usage of the wireless bandwidth of the first device, in response to determining that the wireless connection to the first device is not possible based on the remaining wireless bandwidth of the electronic device and the usage of the wireless bandwidth of the first device, provide a user interface to a display to allow a user to select at least one other wireless device of one or more other wireless devices on which other device wireless connection will be released, from among the one or more other wireless devices that are already wirelessly-connected to the electronic device with the other device wireless connection, release the other device wireless connection to the at least one other wireless device that is selected according to an input through the user interface, and in response to releasing the other device wireless connection, establish the wireless connection to the first device.

The processor is further configured to execute the one or more instructions to identify the usage of the wireless bandwidth of the first device may include instructions to identify based on at least one of manufacturer information of the first device, information about a wireless function requested by the first device, or information about the wireless bandwidth requested by the first device.

The processor is further configured to execute the one or more instructions to calculate the remaining wireless bandwidth of the electronic device by excluding bandwidth used by the one or more other wireless devices that are already wirelessly-connected to the electronic device from an available bandwidth of the electronic device.

The processor is further configured to execute the one or more instructions to: determine that the wireless connection to the first device is possible when the remaining wireless bandwidth of the electronic device is greater than or equal to the usage of the wireless bandwidth of the first device, and determine that the wireless connection to the first device is not possible when the remaining wireless bandwidth of the electronic device is less than the usage of the wireless bandwidth of the first device.

The processor is further configured to execute the one or more instructions to recommend, through the user interface, release of the other device wireless connection to at least one recommended device of the one or more other wireless devices based on an order of a duration of the other device wireless connection for each of the one or more other wireless devices that are already wirelessly-connected to the electronic device.

The processor is further configured to execute the one or more instructions to periodically release the other device wireless connection to any of the one or more other wireless devices based on a duration of the other device wireless connection for any of the one or more other devices being older than a predetermined threshold.

The processor is further configured to execute the one or more instructions to recommend, through the user interface, release of the other device wireless connection to at least one recommended device of the one or more other wireless devices based on how relevant the one or more other wireless devices are to an application running in the electronic device.

The processor is further configured to execute the one or more instructions to recommend, through the user interface, release of the other device wireless connection to at least one recommended device of the one or more other wireless devices based on an order of the other wireless devices having usages corresponding to the usage of the wireless bandwidth of the first device.

The processor is further configured to execute the one or more instructions to recommend, through the user interface, release of the other device wireless connection to at least one recommended device of the one or more other wireless devices which supports USB connection to the electronic device.

An operating method of an electronic device may include: receiving a request for wireless connection from a first device; identifying a usage of a wireless bandwidth of the first device; determining whether a wireless connection to the first device is possible based on a remaining wireless bandwidth of the electronic device and the usage of the wireless bandwidth of the first device; in response to determining that the wireless connection to the first device is not possible based on the remaining wireless bandwidth of the electronic device and the usage of the wireless bandwidth of the first device, providing a user interface to a display to allow a user to select at least one other wireless device of one or more other wireless devices on which other device wireless connection will be released, from among the one or more other wireless devices that are already wirelessly-connected to the electronic device with the other device wireless connection; releasing the other device wireless connection to the at least one other device that is selected according to an input through the user interface; and in response to releasing the other device wireless connection, establishing the wireless connection to the first device.

The identifying the usage of the wireless bandwidth of the first device may include identifying based on at least one of manufacturer information of the first device, information about a wireless function requested by the first device, or information about the wireless bandwidth requested by the first device.

The operating method may further include: calculating the remaining wireless bandwidth of the electronic device by excluding bandwidth used by the one or more other wireless devices that are already wirelessly-connected to the electronic device from an available bandwidth of the electronic device.

The operating method may further include: determining that the wireless connection to the first device is possible when the remaining wireless bandwidth of the electronic device is equal to or greater than the usage of the wireless bandwidth of the first device; and determining that the wireless connection to the first device is not possible when the remaining wireless bandwidth of the electronic device is less than the usage of the wireless bandwidth of the first device.

The operating method may further include: recommending, through the user interface, release of the other device wireless connection to at least one recommended device of the one or more other wireless devices based on an order of a duration of the other device wireless connection for each of the one or more other devices that are already wirelessly-connected to the electronic device.

The operating method may further include: periodically releasing the other device wireless connection to any of the one or more other wireless devices based on a duration of the other device wireless connection for any of the one or more other devices being older than a predetermined threshold.

The operating method may further include: recommending, through the user interface, release of the other device wireless connection to at least one recommended device of the one or more other wireless devices based on how relevant the one or more other wireless devices are to an application running in the electronic device.

The operating method may further include: recommending, through the user interface, release of the other device wireless connection to at least one recommended device of the one or more other wireless devices based on an order of the other wireless devices having usages corresponding to the usage of the wireless bandwidth of the first device.

The operating method may further include: recommending, through the user interface, release of the other device wireless connection to at least one recommended device of the one or more other wireless devices which supports USB connection to the electronic device.

A non-transitory computer-readable recording medium may include a program stored therein for performing an operating method that may include: receiving a request for wireless connection from a first device; identifying a usage of a wireless bandwidth of the first device; determining whether a wireless connection to the first device is possible based on a remaining wireless bandwidth of the electronic device and the usage of the wireless bandwidth of the first device; in response to the determining that the wireless connection to the first device is not possible based on the remaining wireless bandwidth of the electronic device and the usage of the wireless bandwidth of the first device, providing a user interface to a display to allow a user to select at least one other wireless device of one or more other wireless devices on which other device wireless connection will be released, from among the one or more other wireless devices that are already wirelessly-connected to the electronic device with the other device wireless connection; releasing the other device wireless connection to the at least one other device that is selected according to an input through the user interface; and in response to releasing the other device wireless connection, establishing the wireless connection to the first device.

The request for wireless connection may be a request for Bluetooth connection. The usage of the wireless bandwidth of the first device may be a usage of a Bluetooth bandwidth of the first device. The wireless connection to the first device may be a Bluetooth connection to the first device. The remaining wireless bandwidth of the electronic device may be a remaining Bluetooth bandwidth of the electronic device. The at least one other wireless device of the one or more other wireless devices may be at least one other Bluetooth device of one or more other Bluetooth devices. The other device wireless connection may be other device Bluetooth connection.

BRIEF DESCRIPTION OF THE DRAWINGS

The disclosure may be readily understood by combinations of the following detailed descriptions and the accompanying drawings, and reference numerals refer to structural elements.

FIG. 2 illustrates an example of bandwidth required for each function/manufacturer of a Bluetooth device, according to an embodiment of the disclosure.

FIG. 6 is a flowchart illustrating an operating method of an electronic device, according to an embodiment of the disclosure.

FIG. 7 illustrates an example of information about Bluetooth bandwidth for each device, according to an embodiment of the disclosure.

FIG. 8 illustrates an example of information about Bluetooth bandwidth for each device manufacturer, according to an embodiment of the disclosure.

FIG. 9 illustrates an example of information about Bluetooth bandwidth for each device function, according to an embodiment of the disclosure.

FIG. 11 illustrates an example of a list of Bluetooth devices connected to an electronic device, according to an embodiment of the disclosure.

FIG. 14 illustrates an example of a list of Bluetooth devices connected to an electronic device, according to an embodiment of the disclosure.

FIG. 17 illustrates an example of a list of Bluetooth devices connected to an electronic device, according to an embodiment of the disclosure.

FIG. 20 illustrates an example of a list of Bluetooth devices connected to an electronic device, according to an embodiment of the disclosure.

DETAILED DESCRIPTION

Figure 1:
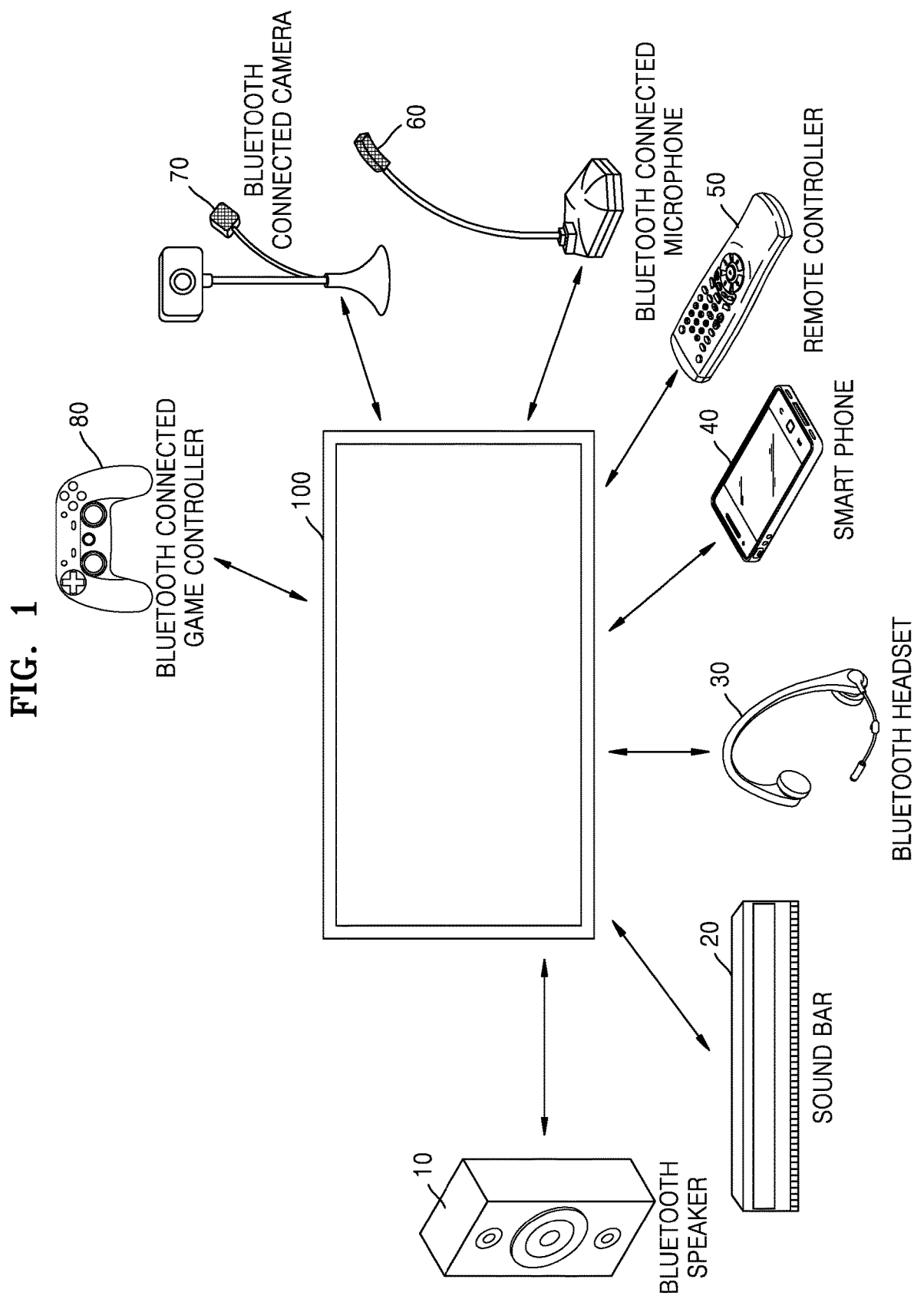
FIG. 1 is a reference diagram for describing examples of various Bluetooth devices that may be connected to an electronic device, according to an embodiment of the disclosure.

Throughout the disclosure, the expression "at least one of a, b, or c" indicates only a, only b, only c, both a and b, both a and c, both b and c, all of a, b, and c, or variations thereof.

Embodiments will now be described with reference to accompanying drawings to assist those of ordinary skill in the art in readily implementing them. However, the disclosed embodiments may be implemented in many different forms, and are not limited to those discussed herein. In the drawings, parts unrelated to the description are omitted for clarity, and like numerals refer to like elements throughout the specification. Throughout the drawings, like reference numerals denote like elements.

When A is said to "be connected" to B, it means to be "directly connected" to B or "electrically connected" to B with C located between A and C. The term "include (or including)" or "comprise (or comprising)" is inclusive or open-ended and does not exclude additional, unrecited elements or method steps, unless otherwise mentioned.

The phrase "an embodiment", "an embodiment of the disclosure" or "some embodiments" that appears often in the specification does not always refer to the same embodiment.

Some embodiments may be described in terms of functional block components and various processing steps. Some or all of the functional blocks may be implemented by any number of hardware and/or software components configured to perform the specified functions. For example, the functional blocks may be implemented by one or more processor or microprocessors or implemented by circuit elements for performing intended functions. Furthermore, for example, the functional blocks may be implemented in various programing or scripting languages. The functional blocks may be implemented in algorithms executed on one or more processors. Moreover, disclosed embodiments may employ any number of traditional techniques for electronic configuration, signal processing and/or data processing. The words "module" and "configuration" are used broadly and are not limited to mechanical or physical components.

Connecting lines or members between the elements illustrated in the accompanying drawings are illustratively shown as functional and/or physical connections or circuit connections. In practice, functional, physical, or circuit connections that may be replaced or added may be employed between the elements.

The expression "at least one of a, b or c" indicates only a, only b, only c, both a and b, both a and c, both b and c, all of a, b, and c, or variations thereof.

An electronic device is a computing device including a communication module to perform Bluetooth communication, and may exist in a wide variety of forms. For example, the electronic device may be a wearable device, a smart phone, a personal digital assistant (PDA), a media player, a tablet personal computer (PC), a laptop computer, a media player, a television (TV), a digital TV, a smart TV, a digital signage, and/or a digital billboard, without being limited thereto. Hereinafter, a device capable of providing Bluetooth communication will be referred to as the electronic device, for convenience of explanation.

The term "Bluetooth" as herein used may refer to a device, software, an interface, and/or other component, that operates according to one or more Bluetooth technology standards including Bluetooth core specification versions 1.2, 2.0, and 2.1+ (EDR).

In the accompanying drawings, an occasion when the electronic device is a TV will be taken as an example. Furthermore, in the accompanying drawings, like elements are denoted by like reference numerals. Also, throughout the specification, the same element is denoted with the same term.

An electronic device and method for operating the same will now be described in detail with reference to accompanying drawings.

FIG. 1 is a reference diagram for describing examples of various Bluetooth devices that may be connected to an electronic device, according to an embodiment of the disclosure.

Referring to FIG. 1, an electronic device 100 may use a Bluetooth communication protocol to connect to one or more Bluetooth devices.

The electronic device 100 may use the Bluetooth communication protocol to connect to a Bluetooth speaker 10 for communication and output voice or audio data to the Bluetooth speaker 10.

The electronic device 100 may use the Bluetooth communication protocol to connect to a sound bar 20 for communication and output voice or audio data to the sound bar 20.

The electronic device 100 may use the Bluetooth communication protocol to connect to a Bluetooth headset 30 for communication and output voice or audio data to the Bluetooth headset 30 or receive voice or audio data obtained by the Bluetooth headset 30. For example, while performing a voice call function as well as running a game application, the electronic device 100 may receive a user's voice data obtained by the Bluetooth headset 30 or transmit voice data of the other user of the voice call to the Bluetooth headset 30.

The electronic device 100 may use the Bluetooth communication protocol to connect to a smart phone 40 for communication and transmit or receive audio data, video data or control data to or from the smart phone 40.

The electronic device 100 may use the Bluetooth communication protocol to connect to a remote controller 50 for communication and transmit or receive a control signal or voice data to or from the remote controller 50. For example, the electronic device 100 may receive a control signal input to the remote controller 50 to control the electronic device 100.

The electronic device 100 may use the Bluetooth communication protocol to connect to a Bluetooth connected mike (or microphone) 60 for communication and receive voice data or audio data obtained by the Bluetooth connected mike 60. For example, while performing a voice recognition function or running a karaoke application, the electronic device 100 may receive the user's voice data or audio data obtained by the Bluetooth connected mike 60 through the Bluetooth connected microphone 60.

The electronic device 100 may use a Bluetooth connected camera 70 to connect to the Bluetooth communication protocol for communication and receive image data obtained by the Bluetooth connected camera 70. For example, while performing a video call operation, the electronic device 100 may receive, from the Bluetooth connected camera 70, an image of a user of the video call captured through the Bluetooth connected camera 70.

The electronic device 100 may use the Bluetooth communication protocol to connect to a Bluetooth connected game controller 80 for communication and receive a signal corresponding to a control input entered to the Bluetooth connected game controller 80. For example, while running a game application, the electronic device 100 may receive, from the Bluetooth connected game controller 80, a control signal corresponding to a control input entered through the Bluetooth connected game controller 80.

As such, the electronic device 100 that supports Bluetooth communication may connect to one or more Bluetooth devices in an allowable range of Bluetooth communication bandwidth of the electronic device 100. When the electronic device 100 receives a request for Bluetooth communication connection from a new Bluetooth device, there may be a lack of available Bluetooth bandwidth of the electronic device 100 for connection to the new Bluetooth device. In this case, the electronic device 100 may release connection to a Bluetooth device selected from among already connected one or more Bluetooth devices to make a Bluetooth connection to the new Bluetooth device. Alternatively, the electronic device 100 may output a message indicating that connection to the new Bluetooth device is not possible.

In this case that the request for connection is received from the new Bluetooth device, the electronic device 100 may perform an operation of recommending the user optimal Bluetooth connection based on a result of determining whether to make a Bluetooth connection to the new Bluetooth device based on at least one of environment information of the new Bluetooth device that request the connection or environment information of the electronic device 100 instead of simply releasing the existing Bluetooth connection or indicating that it is not possible to connect to the new Bluetooth device.

FIG. 2 illustrates an example of bandwidth required for each function/manufacturer of a Bluetooth device, according to an embodiment of the disclosure.

In a Piconet, a master unit acts like a base station. Bluetooth basically uses a frequency hopping method and has 1600 hops per second. Slave units which participate once in the Piconet synchronize with a clock of the master. This may make it possible to perform communication while following the hopping sequence determined by the mater unit. The hopping sequence is an agreement between the master unit and the slave unit. When the slave unit fails to synchronize with the master unit and ends in failure to follow the hopping sequence, channels of the two units are out of sync all the time and never make communication. Along with the frequency hopping method, time division duplex (TDD) is an important communication method for Bluetooth. Each channel having a bandwidth of 1 MHz is allocated a time slot of 625 μs. A packet is transmitted in each time slot, and in a case of a long packet, it is divided and transmitted in a plurality of time slots.

A Bluetooth bandwidth, i.e., a required amount of time slots, may vary depending on a function used by the Bluetooth device. Furthermore, even for Bluetooth devices that perform the same function, Bluetooth bandwidths, i.e., required amounts of time slots may be different depending on the manufacturers.

Referring to FIG. 2, functions performed in the background of the electronic device 100 may include page scanning, inquiry scanning, and advertising, which may require 36 slots, 18 slots, and 4 slots, respectively. According to the advanced audio distribution profile (A2DP) profile, data transmissions of 195 kbps and 237 kbps may each require 24 slots. A Bluetooth remote control function may require 2 slots. Of a human interface device (HID), a keyboard operation may require 6 slots, a mouse operation 6 slots, operation of a game controller (of manufacturer A) 6 slots, operation of a game controller (of manufacturer B) 6 slots, operation of a game controller (of manufacturer C) 8 slots, and operation of a game controller (of manufacturer D) 12 slots.

As such, different bandwidths for Bluetooth communication may be required depending on the manufacturer of the Bluetooth device and functions performed with the Bluetooth device.

Figure 3:
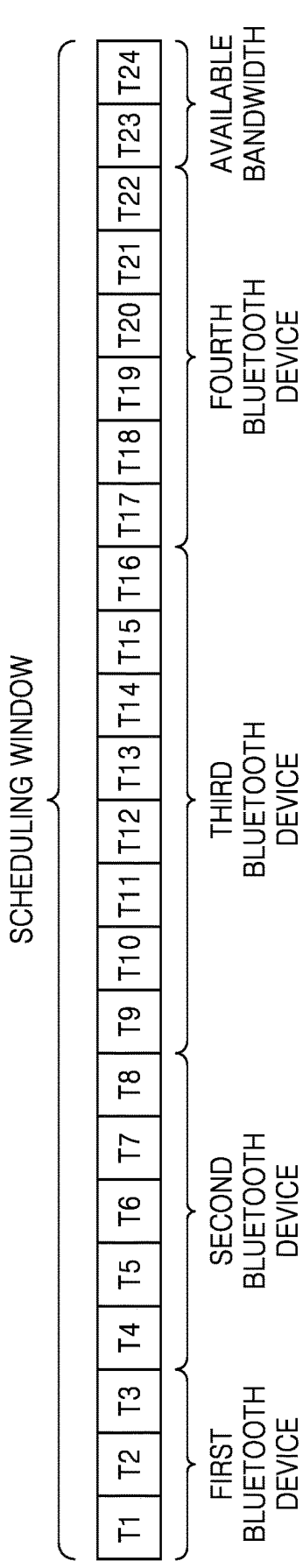
FIG. 3 illustrates an example of time multiplexing scheduling, according to an embodiment of the disclosure.

FIG. 3 illustrates an example of time multiplexing scheduling, according to an embodiment of the disclosure.

Referring to FIG. 3, a time multiplexing scheduling window includes a total of 24 time slots from T1 to T24. Each time slot is 625 μs long. Referring to FIG. 3, for example, 3 time slots from T1 to T3 may be allocated for a first Bluetooth device, time slots from T4 to T8 may be allocated for a second Bluetooth device, 8 time slots from T9 to T16 may be allocated for a third Bluetooth device, and 6 time slots from T17 to 22 may be allocated for a fourth Bluetooth device. 2 time slots from T23 and T24 remain as an available bandwidth for connection to a new Bluetooth device. In other words, a total number of time slots that make up the scheduling window of the electronic device 100 may be a maximum Bluetooth bandwidth of the electronic device 100, and the number of remaining time slots obtained by excluding the number of time slots occupied by one or more already connected Bluetooth devices from the maximum Bluetooth bandwidth may be the available Bluetooth bandwidth of the electronic device 100.

In this situation, when the bandwidth required by the new Bluetooth device that sends the request for Bluetooth connection is 2 time slots or less, the electronic device 100 may use the two time slots T23 and T24 to handle the Bluetooth communication, thereby having no difficulty in making connection to the new Bluetooth device. On the other hand, when the bandwidth required by the new Bluetooth device that sends the request for Bluetooth connection is 3 time slots or more, the electronic device 100 may determine that communication with the new Bluetooth device may not be handled with the available bandwidth of current 2 time slots. Hence, the electronic device 100 may recommend the user to release Bluetooth connection to the already connected one or more Bluetooth devices to handle the request of the new Bluetooth device for Bluetooth connection.

In recommending the release of Bluetooth connection to the already connected one or more Bluetooth devices, the electronic device 100 may recommend a Bluetooth device to be disconnected by taking environment information of the electronic device 100 or environment information of the Bluetooth device that sends the request for Bluetooth connection into account.

The environment information of the electronic device 100 may include information about one or more Bluetooth devices connected to the electronic device 100. For example, the information about one or more Bluetooth devices connected to the electronic device 100 may include information about connection points in time of one or more Bluetooth devices connected to the electronic device 100. The electronic device 100 may recommend a Bluetooth device, Bluetooth connection of which is to be required, among the one or more Bluetooth devices connected to the electronic device 100, based on an order of older connection points in time. As a Bluetooth device having the oldest connection point in time is considered least likely to be used again, it is desirable to recommend the Bluetooth device having the oldest connection point in time as a Bluetooth device to be disconnected.

The environment information of the electronic device 100 may include attribute information of an application that is running in the electronic device 100. The attribute information of the application running in the electronic device 100 may include information about a category or genre of the application running in the electronic device 100. The electronic device 100 may recommend a Bluetooth device, Bluetooth connection of which is to be released, among the one or more Bluetooth devices connected to the electronic device 100, based on an order of Bluetooth devices less relevant to an attribute of the application running in the electronic device 100. As such, a Bluetooth device having low relevance to an attribute of the application currently running in the electronic device 100 is considered less likely to be used by the user now or in the near future, so it is desirable to recommend the Bluetooth device as a Bluetooth device to be disconnected.

The environment information of the electronic device 100 may include information about whether a Bluetooth device connected to the electronic device 100 supports USB connection. For example, the information about whether a Bluetooth device connected to the electronic device 100 supports USB connection refers to information about whether the Bluetooth device connected to the electronic device 100 also supports USB connection. The electronic device 100 may recommend a device that supports USB connection among the one or more Bluetooth devices connected to the electronic device 100 as a Bluetooth device, Bluetooth connection of which is to be released. As such, when there is a device that supports USB connection among Bluetooth devices already currently connected to the electronic device 100, the device that supports USB connection has an alternative method of USB connection, so it is desirable to recommend the device as a Bluetooth device to be disconnected.

The environment information of the device that requests Bluetooth connection may include information about an expected usage of the Bluetooth bandwidth of the device that requests Bluetooth connection. The electronic device 100 may recommend a Bluetooth device, Bluetooth connection of which is to be released, among the one or more Bluetooth devices connected to the electronic device 100, based on an order of Bluetooth devices having a corresponding or similar bandwidth to the expected usage of the Bluetooth bandwidth of the device that requests Bluetooth connection. As such, a Bluetooth device having the nearest similarity to the expected usage of the Bluetooth bandwidth required by a Bluetooth device that newly requests a connection among the Bluetooth devices currently connected to the electronic device 100 is recommended to be disconnected, thereby securing an optimally available Bluetooth bandwidth.

Figure 4:
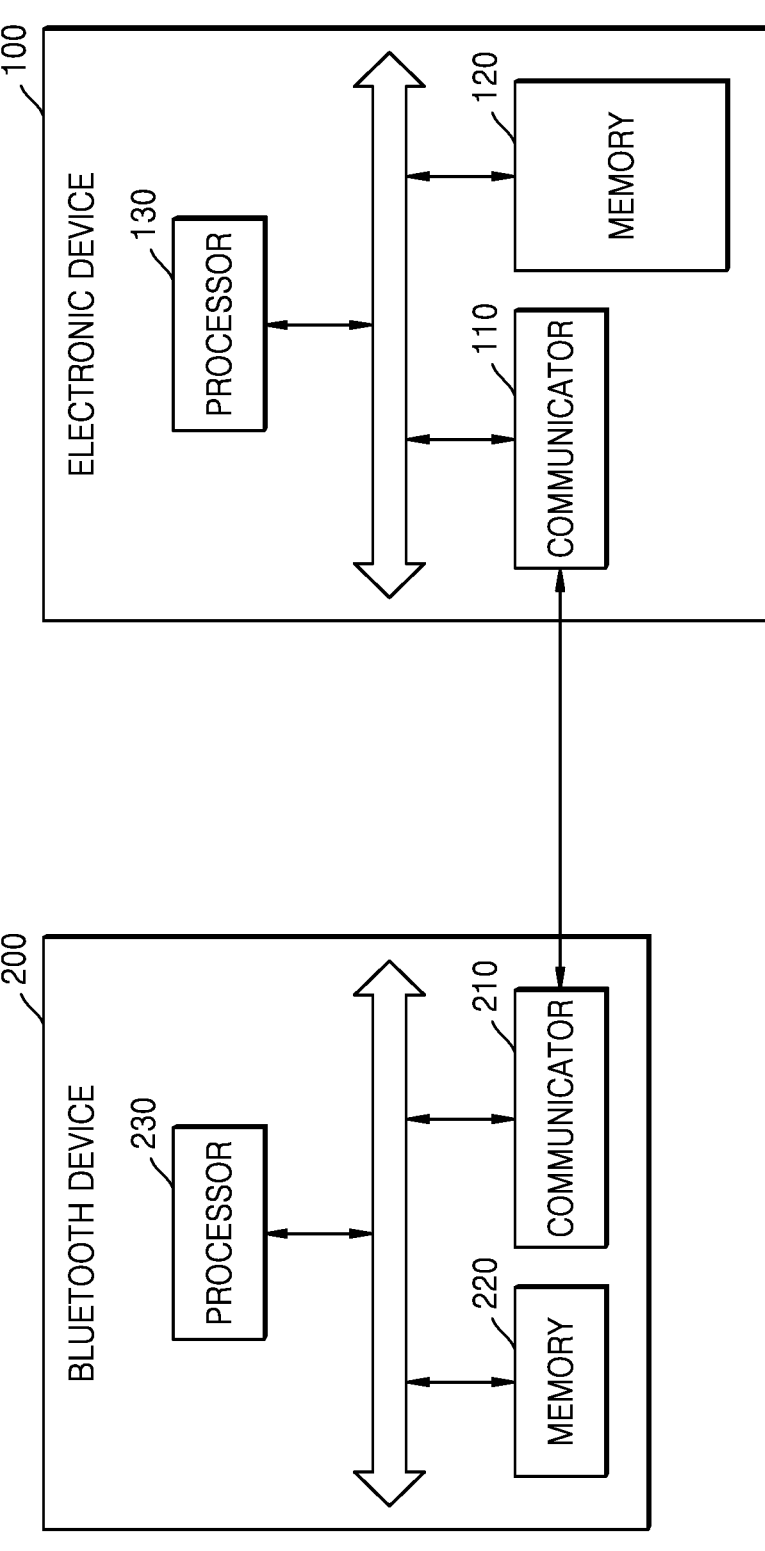
FIG. 4 is a block diagram of an example of an electronic device and a Bluetooth device, according to an embodiment of the disclosure.

FIG. 4 is a block diagram of an example of an electronic device and a Bluetooth device, according to an embodiment of the disclosure.

Referring to FIG. 4, a system may include the electronic device 100 and a Bluetooth device 200.

The Bluetooth device 200 may include a communicator 210, a memory 220, and a processor 230.

The Bluetooth device 200 may be any electronic device that may perform Bluetooth communication. For example, the Bluetooth device 200 may include a Bluetooth speaker, a Bluetooth sound bar, a Bluetooth headset, a smart phone, a Bluetooth communication remote controller, a Bluetooth connected microphone, and/or a Bluetooth game controller.

The communicator 210 may use various communication technologies to communicate with an external device. Especially, the communicator 210 may use a Bluetooth communication module to make a Bluetooth communication connection.

The memory 220 may store data or one or more instructions required to control or function the Bluetooth device 200.

The processor 230 may control a function of the Bluetooth device 200 to be implemented by executing one or more instructions stored in the memory 220.

The electronic device 100 may include a communicator 110, a memory 120, and a processor 130.

The electronic device 100 may include various types of electronic device, e.g., a computer such as a desktop, a laptop, and a tablet, a TV, a set-top box, a smart phone, a game player, a music player, a video player, medical equipment, and/or a home appliance.

The communicator 110 may perform connection and communication with one or more Bluetooth devices through at least a Bluetooth communication module.

The memory 120 may store a program for processes and control of the processor 130, and store data input to or output from the electronic device 100. Furthermore, the memory 120 may store data required for operation of the electronic device 100.

The memory 120 may include at least one type of storage medium including a flash memory, a hard disk, a multimedia card micro type memory, a card type memory (e.g., SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

The processor 130 controls general operation of the electronic device 100. For example, the processor 130 may perform a function of the electronic device 100 by executing one or more instructions stored in the memory 120.

The processor 130 may have a built-in memory that stores one or more instructions and execute the one or more instructions stored in the built-in memory to perform operations of the electronic device. In other words, the processor 130 may execute at least one instruction or program stored in the built-in memory equipped in the processor 130 or the memory 120 to perform an operation.

The processor 130 may execute the one or more instructions stored in the memory 120 to receive a request for Bluetooth connection from a first device and identify usage of Bluetooth bandwidth of the first device.

The processor 130 may execute the one or more instructions stored in the memory 120 to determine whether Bluetooth connection to the first device is possible based on a remaining bandwidth of the electronic device and the Bluetooth bandwidth of the first device.

The processor 130 may execute the one or more instructions stored in the memory 120 to provide a user interface to select at least one Bluetooth device for which release of Bluetooth connection is possible from among one or more Bluetooth devices to which Bluetooth connection has already been made to allow Bluetooth connection to the first device, based on the remaining bandwidth of the electronic device and a Bluetooth bandwidth of the first device in response to the determining that Bluetooth connection to the first device is not possible based on the remaining bandwidth of the electronic device.

The processor 130 may execute one or more instructions stored in the memory 120 to release Bluetooth connection to at least one Bluetooth device selected according to an input through the user interface and perform Bluetooth connection to the first device.

The processor 130 may execute one or more instructions stored in the memory 120 to identify usage of Bluetooth bandwidth of the first device based on at least one of manufacturer information of the first device, information about a Bluetooth function requested by the first device, or information about a Bluetooth bandwidth requested by the first device included in the Bluetooth connection request of the first device.

The processor 130 may execute one or more instructions stored in the memory 120 to calculate a remaining bandwidth of the electronic device by excluding bandwidth used by one or more Bluetooth devices already Bluetooth-connected to the electronic device from an available bandwidth of the electronic device.

The processor 130 may execute one or more instructions stored in the memory 120 to determine that Bluetooth connection to the first device is possible when the remaining bandwidth of the electronic device is equal to or greater than the usage of Bluetooth bandwidth of the first device, and determine that Bluetooth connection to the first device is not possible when the remaining bandwidth of the electronic device is less than the usage of Bluetooth bandwidth of the first device.

The processor 130 may execute one or more instructions stored in the memory 120 to recommend release of a Bluetooth connection through the user interface based on an order of Bluetooth devices having older connection points in time among one or more Bluetooth devices to which Bluetooth connection has already been made.

The processor 130 may execute one or more instructions stored in the memory 120 to periodically release Bluetooth connection to one or more Bluetooth devices to which Bluetooth connection has already been made, based on an order of Bluetooth devices having older connection points in time among the already Bluetooth-connected one or more Bluetooth devices.

The processor 130 may execute one or more instructions stored in the memory 120 to recommend release of Bluetooth connection through the user interface based on relevance to an application running in the electronic device among one or more Bluetooth devices to which Bluetooth connection has already been made.

The processor 130 may execute one or more instructions stored in the memory 120 to recommend release of Bluetooth connection through the user interface based on an order of Bluetooth devices having usages corresponding to the bandwidth usage of the first device among one or more Bluetooth devices to which Bluetooth connection has already been made.

The processor 130 may execute one or more instructions stored in the memory 120 to recommend release of Bluetooth connection to a Bluetooth device that supports USB connection and recommend USB connection to the Bluetooth device that supports the USB connection among one or more Bluetooth devices to which Bluetooth connection has already been made, through the user interface.

The block diagram of the electronic device 100 as shown in FIG. 3 is merely an example that is implemented in an embodiment. Components of the block diagram may be merged, added or omitted according to actual specifications of the electronic device 100. For example, two or more components may be merged into one, or a single component may be split into two or more components as needed. Functions performed in the blocks are shown for exemplary purposes, and the disclosed embodiments are not limited to the detailed operation or components corresponding to the blocks.

Figure 5:
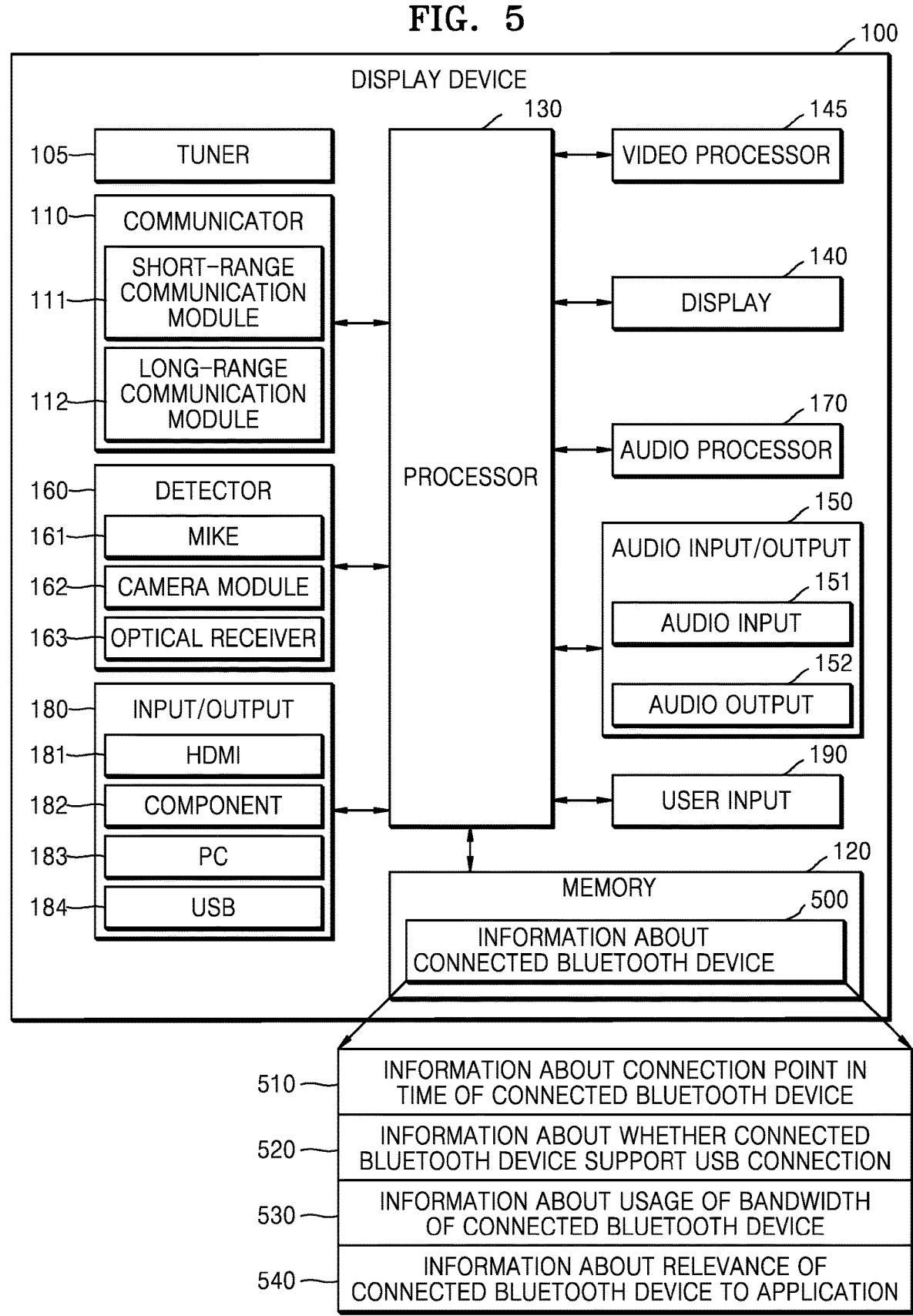
FIG. 5 is a detailed block diagram of an electronic device, according to an embodiment of the disclosure.

FIG. 5 is a detailed block diagram of an electronic device, according to an embodiment of the disclosure. The electronic device 100 shown in FIG. 5 may correspond to the electronic device 100 as shown in FIG. 4. Hence, what are described above in connection with FIG. 4 will not be repeated in describing the electronic device 100.

Referring to FIG. 5, the electronic device 100 may include a tuner 105, the communicator 110, a display 140, a video processor 145, the memory 120, the processor 130, an audio output 150, a detector 160, an audio processor 170, an input/output 180, and a user input 190.

The tuner 105 may tune in to a frequency of a channel that the electronic device 100 intends to receive among a lot of radio components through amplification, mixing, resonance of broadcast signals received wiredly or wirelessly. The broadcast signal includes audio, video, and additional information, e.g., electronic program guide (EPG).

The tuner 105 may receive a broadcast signal in a frequency band corresponding to a channel number (e.g., cable channel no. 506) according to a user input (for example, a control signal, e.g., a channel number input, a channel up/down input and a channel input on an EPG screen) received from an external control device (not shown), e.g., a remote controller.

The tuner 105 may receive broadcast signals from various sources such as terrestrial broadcasters, cable broadcasters, satellite broadcasters, and/or Internet broadcasters. The tuner 105 may also receive broadcast signals from a source such as an analog broadcaster or a digital broadcaster. A broadcast signal received through the tuner 105 is decoded and divided into audio, video and/or additional information. The divided audio, video and/or additional information may be stored in the memory 120 under the control of the processor 130.

The tuner 105 may be implemented as an all-in-one device with the electronic device 100 or implemented in a separate device (e.g., a set-top box (not shown), a tuner (not shown) connected to the input/output 180) having a tuner electrically connected to the electronic device 100.

The communicator 110 communicates with an external electronic device (not shown) over at least one wired or wireless communication network. The communicator 110 may communicate with the Bluetooth device 200.

The communicator 110 may communicate with an external device (e.g., the Bluetooth device 200) over a communication network. Specifically, the communicator 110 may have a form that includes at least one communication module, a communication circuit, and/or other communication components, and may transmit or receive data to or from an external device through the communication module and/or the communication circuit.

Specifically, the communicator 110 may include at least one short-range communication module 111 to perform communication according to a communication standard such as Bluetooth, wireless fidelity (Wi-Fi), Bluetooth low energy (BLE), near field communication/radio frequency identification (RFID), Wi-Fi direct, ultra wideband (UWB) or Zigbee.

Furthermore, the communicator 110 may further include a long-range communication module 112 to perform communication with a server for supporting long-range communication according to a long-range communication standard. Specifically, the communicator 110 may include a long-range communication module that performs communication over a network for Internet communication. Moreover, the communicator 110 may include a communication network according to a communication standard such as 3G, 4G and/or 5G.

The display 140 displays a screen. Specifically, a video included in a broadcast signal received through the tuner may be displayed on the screen under the control of the processor 130. Furthermore, the display 140 may display a content, e.g., a video, received through the communicator 110 or the input/output 180.

The display 140 may also output an image stored in the memory 120, under the control of the processor 130. The display 140 may display a voice user interface (UI) (e.g., including a voice instruction guide) for performing a voice recognition task corresponding to voice recognition or a motion UI (e.g., including a user motion guide for motion recognition) for performing a motion recognition task corresponding to motion recognition.

The video processor 145 may perform an image process on video data. Specifically, the video processor 145 may perform a process on video data, e.g., an image signal, received by the electronic device 100. The video processor

145 may perform various image processes such as decoding, scaling, noise removal, frame rate conversion, and/or resolution conversion, on the video data.

The memory 120 may store at least one instruction. The memory 120 may also store at least one instruction to be executed by the processor 130. The memory 120 may also store at least one program to be executed by the processor 130. The memory 120 may also store an application to provide a certain service.

Specifically, the memory 120 may include at least one type of storage medium including a flash memory, a hard disk, a multimedia card micro type memory, a card type memory (e.g., SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

The memory 120 may store information 500 about Bluetooth devices connected to the electronic device. The information 500 about Bluetooth devices may include information about connection points in time of connected Bluetooth devices 510, information about whether USB connection is supported by the connected Bluetooth devices 520, information about bandwidth usages of the connected Bluetooth devices 530, and information about relevance of the connected Bluetooth devices to an application 540.

The audio input/output 150 may output audio that may be audibly recognized by the user, or detect and/or receive audio. Specifically, the audio input/output 150 may include an audio input 151 and an audio output 152.

The audio input 151 receives audio. Specifically, the audio input 151 may include a mike (specifically, a microphone) that receives and processes an external acoustic signal, audio, to electrical voice data. For example, the mike included in the audio input 151 may receive an acoustic signal from an external device or a speaker, e.g., the other user on a video call. Furthermore, the mike included in the audio input 151 may use various noise-cancellation algorithms to cancel noise generated in the course of receiving the external acoustic signal.

The audio output 152 outputs audio under the control of the processor 130.

Specifically, the audio output 152 may output audio, e.g., voice or sound, received through the communicator 110.

The audio output 152 outputs audio included in a broadcast signal received through the tuner under the control of the processor 130. The audio output 152 may output audio, e.g., voice or sound, received through the communicator 110 or the input/output 180. Furthermore, the audio output 152 may output audio stored in the memory 120 under the control of the processor 130.

Furthermore, the audio output 152 may output audio stored in the memory 120 under the control of the processor 130. The audio output 152 may include at least one of a speaker, a headphone output terminal or a Sony/Philips digital interface (S/PDIF) output terminal. The audio output 152 may include a combination of the speaker, the headphone output terminal and the Sony/Philips digital interface (S/PDIF) output terminal.

The audio processor 170 processes audio data. For example, the audio processor 170 may perform various processes such as decoding, amplification, and/or noise removal, on the audio data. The audio processor 170 may include a plurality of audio processing modules to process audio for multiple contents.

The detector 160 detects the user's voice, the user's image or the user's interaction.

A mike 161 receives voice uttered by the user. The mike 161 may convert the received voice into an electrical signal and output the electrical signal to the processor 130. The user's voice may include, for example, a voice corresponding to a menu or function of the electronic device 100. For example, a recognition range of the mike 161 is recommended to be 4 meters or less from the mike 161 to the user's position, and the recognition range of the mike 161 may vary to correspond to amplitude of the user's voice and surrounding conditions (e.g., speaker sound, surrounding noise).

The mike 161 may be implemented integrally with or separately from the electronic device 100. The separated mike 161 may be electrically connected to the electronic device 100 through the communicator 110 or the input/output 180.

It is obvious to those of ordinary skill in the art that the mike 161 may be omitted depending on the performance and structure of the electronic device 100.

A camera module 162 may receive an image, e.g., consecutive frames, corresponding to a motion of the user including a gesture within a camera recognition range. For example, the recognition range of the camera module 162 may be a range of 0.1 to 5 m from the camera module 162 to the user. The motion of the user may include e.g., a motion of a portion of the user's body or a portion of the user such as the user's face, facial expression, hand, fist, or finger(s). The camera module 162 may convert a received image into an electrical signal and output the electrical signal to the processor 130 under the control of the processor 130.

The camera module 162 may include a lens and an image sensor. The camera module 162 may use a plurality of lenses and image processing to support optical zoom or digital zoom. The recognition range of the camera module 162 may be set in various ways depending on the camera angle and the surrounding environmental condition. When the camera module 162 includes a plurality of cameras, the plurality of cameras may be used to receive a three dimensional (3D) still image or 3D motion. The camera 162 may include two or more cameras including e.g., a normal camera and a zoom camera.

The camera module 162 may be implemented integrally with or separately from the electronic device 100. An extra device (not shown) including the separated camera module 162 may be electrically connected to the electronic device 100 through the communicator 110 or the input/output 180.

It is obvious to those of ordinary skill in the art that the camera module 162 may be omitted depending on the performance and structure of the electronic device 100.

An optical receiver 163 receives an optical signal (including a control signal) received from an external control device through a light window on the bezel of the display 140. The optical receiver 163 may receive an optical signal corresponding to the user input, e.g., touch, push, touching gesture, voice, or motion of the user, from the remote control device. A control signal may be extracted from the received optical signal under the control of the processor 130.

The input/output 180 may receive input data in various formats. Data received through the input/output 180 may have such formats as RGBA, or YUV. The input/output 180 may receive a plurality of input data items (specifically, image sources) having various formats.

The input/output module 180 receives a video (e.g., a moving image), an audio (e.g., a voice, and/or music), and/or additional information (e.g., an EPG), from outside of the electronic device 100 under the control of the processor 130. The input/output module 180 may include one of a high-definition multimedia interface (HDMI) port 181, a component jack 182, a personal computer (PC) port 183, and a universal serial bus (USB) port 184. The input/output 180 may include a combination of the HDMI port 181, the component jack 182, the PC port 183, and the USB port 184.

It is obvious to those of ordinary skill in the art that the configuration and operation of the input/output 180 may be implemented variously in the disclosed embodiments.

The user input 190 may receive a user input to control the electronic device 100. For example, the user interface 100 may receive a video call request from the user.

The user input 190 may include a user input device including a touch panel for detecting a touch of the user, a button for receiving a push operation of the user, a wheel for receiving a turning manipulation of the user, a keyboard, and/or a dome switch, without being limited thereto.

Furthermore, the user input 190 is a voice recognition device for voice recognition, e.g., a microphone, which may receive the user's voice command or voice request. Accordingly, the processor 130 may control an operation corresponding to the voice command or voice request to be performed.

Furthermore, the user input 190 may include a motion detection sensor (not shown). For example, the motion detection sensor (not shown) may detect a motion of the electronic device 100, and receive the detected motion as a user input. The aforementioned voice recognition device (not shown) and the motion detection sensor (not shown) may not be integrated in the user input 190 but may be included as a module separate from the user input 190 in the electronic device 100.

Furthermore, the user input 190 may receive a user input through e.g., a remote controller. In this case, the user input 190 may include a communication module for receiving a signal corresponding to a user input from the remote controller (not shown). For example, when the remote controller transmits an infrared (IR) signal corresponding to a user input, the user interface 190 may include a photo receiving module for receiving the IR signal.

The processor 130 may control general operation of the electronic device 100 and signal flows between the internal components (not shown) of the electronic device 100, and process data. The processor 130 may run an operating system (OS) and various applications stored in the memory 120 at the user's request or when a predetermined condition is met.

The processor 130 may include a graphic processing unit (not shown) for graphic processing corresponding to a video. The graphic processing unit may use a calculator (not shown) and a renderer (not shown) to generate a screen including various objects such as icons, images, and/or text. The calculator may use the user interaction detected by the detector (not shown) to calculate an attribute value such as a coordinate value, a shape, a size, and/or color, in which each of the objects may be displayed, based on the layout of the screen. The renderer generates screens in various layouts, which include an object, based on the attribute value calculated by the calculator.

The processor 130 may use various information included in the Bluetooth device information 500 stored in the memory 120 to perform an operation of the electronic device 100 as disclosed herein.

Operations performed by the electronic device 100 will now be described in detail with reference to FIGS. 6 to 21.

FIG. 6 is a flowchart illustrating a method of operating an electronic device, according to an embodiment of the disclosure. A method of operating the electronic device shown in FIG. 6 refers to flows of operations performed by the electronic device 100.

Referring to FIG. 6, in operation 610, the electronic device 100 may receive a Bluetooth connection request from the first device 200. To distinguish Bluetooth devices that are already Bluetooth-connected to the electronic device 100 from a Bluetooth device that newly sends a connection request, the Bluetooth device that newly sends the connection request will now be referred to as a first device. The first device may refer to the Bluetooth device 200 as shown in FIG. 4.

In operation 620, the electronic device 100 may identify usage of Bluetooth bandwidth of the first device. Specifically, the electronic device 100 may identify usage of Bluetooth bandwidth of the first device required to perform Bluetooth communication with the first device.

The Bluetooth connection request received from the first device may include identification information of the first device. The electronic device 100 may store information about Bluetooth bandwidth required for each Bluetooth device. Accordingly, the electronic device 100 may identify the usage of Bluetooth bandwidth of the first device that has transmitted the Bluetooth connection request by referring to the identification information of the first device included in the Bluetooth connection request and information about Bluetooth bandwidth for each device stored.

FIG. 7 illustrates an example of information about Bluetooth bandwidth for each device, according to an embodiment of the disclosure.

Referring to FIG. 7, information 700 about Bluetooth bandwidth for each device indicates that the first device requires a bandwidth of 18 slots, a second device 12 slots, a third device 2 slots, and a fourth device 6 slots. For example, the first to fourth devices may include a Bluetooth headset, a Bluetooth microphone, a Bluetooth game controller, and/or a Bluetooth speaker.

The Bluetooth connection request received from the first device may further include manufacturer information as the identification information of the first device. The electronic device 100 may store information about Bluetooth bandwidth required for each device manufacturer of each Bluetooth device. Accordingly, the electronic device 100 may identify the usage of Bluetooth bandwidth of the first device that has transmitted the Bluetooth connection request by referring to the manufacturer information of the first device included in the Bluetooth connection request and information about Bluetooth bandwidth for each device manufacturer stored.

FIG. 8 illustrates an example of information about Bluetooth bandwidth for each device manufacturer, according to an embodiment of the disclosure.

Referring to FIG. 8, information 800 about Bluetooth bandwidth for each device manufacturer indicates that a first manufacturer of the first device requires a bandwidth of 16 slots, a second manufacturer 12 slots, a third manufacturer 16 slots, and a fourth manufacturer 18 slots. For example, the first device may be a game controller, and the first to fourth manufacturers may be different manufacturers of the game controller. Even the same type of game controllers may require a different bandwidth for each manufacturer of the game controller, so the bandwidth of the Bluetooth device that has requested Bluetooth connection may be more exquisitely determined by managing the bandwidth information for each manufacturer.

The Bluetooth connection request received from the first device may further include information about a function to be performed by the first device through Bluetooth communication. The electronic device 100 may store information about Bluetooth bandwidth for each function of each Bluetooth device. Accordingly, the electronic device 100 may identify the usage of Bluetooth bandwidth of the first device that has transmitted the Bluetooth connection request by referring to the function information of the first device included in the Bluetooth connection request and information about Bluetooth bandwidth for each function stored.

FIG. 9 illustrates an example of information about Bluetooth bandwidth for each device function, according to an embodiment of the disclosure.

Referring to FIG. 9, information 900 about Bluetooth bandwidth for each function of the Bluetooth device indicates that a first function of the first device requires a bandwidth of 4 slots, a second function 12 slots, a third function 16 slots. For example, the first device may be a smart phone, and the first function of the first device may be a remote controller function, the second function of the first device may be a mirroring function, and the third function of the first device may be a game controller function. Even the same type of smart phone devices may require a different bandwidth for each function to be performed by Bluetooth communication, so the bandwidth of the Bluetooth device that has requested Bluetooth connection may be more exquisitely determined by managing the bandwidth information for each device function.

The electronic device 100 may store one or more of bandwidth information for each Bluetooth device 700, bandwidth information for each manufacturer of the Bluetooth device 800, and bandwidth information for each function of the Bluetooth device 900.

In operation 630, the electronic device 100 may determine whether Bluetooth connection is possible based on the remaining bandwidth of the electronic device 100 and the Bluetooth bandwidth of the first device.

The remaining bandwidth of the electronic device 100 may refer to a bandwidth obtained by excluding bandwidth used to connect to the already connected Bluetooth device(s) from the maximum Bluetooth bandwidth of the electronic device 100. For example, as shown in FIG. 3, the remaining bandwidth of the electronic device 100 may be remaining two slots obtained by excluding the bandwidth occupied by the already connected Bluetooth devices, i.e., 22 slots, from the maximum bandwidth, 24 slots, of the electronic device 100.

The electronic device 100 may determine the Bluetooth bandwidth of the first device that has transmitted the connection request as described in operation 620.

The electronic device 100 may compare the remaining bandwidth of the electronic device 100 with the Bluetooth bandwidth of the first device and determine that connection for Bluetooth communication of the first device is possible when the remaining bandwidth of the electronic device 100 is equal to or greater than the Bluetooth bandwidth of the first device. In this case, the electronic device 100 may proceed to operation 660 to perform an operation of Bluetooth connection to the first device.

The electronic device 100 may compare the remaining bandwidth of the electronic device 100 with the Bluetooth bandwidth of the first device and determine that connection for Bluetooth communication of the first device is not possible when the remaining bandwidth of the electronic device 100 is less than the Bluetooth bandwidth of the first device. In this case, operation 640 may be proceeded.

In operation 640, the electronic device 100 may provide a user interface to select at least one Bluetooth device for which release of Bluetooth connection is possible, among the already Bluetooth-connected one or more Bluetooth devices to enable connection to the first device.

The electronic device 100 may obtain information about the already Bluetooth-connected one or more Bluetooth devices. The already Bluetooth-connected one or more Bluetooth devices may include devices to which Bluetooth connection has been made before and Bluetooth connection of which is not yet released. For example, Bluetooth devices connected once by making Bluetooth connection according to a policy of the electronic device 100 until an operation to release the Bluetooth connection occurs may remain in the Bluetooth-connected state for several hours to several days.

The information about the already Bluetooth-connected one or more Bluetooth devices may include information about connection points in time of the already Bluetooth-connected one or more Bluetooth devices.

The information about the already Bluetooth-connected one or more Bluetooth devices may include information about bandwidth used by the already Bluetooth-connected one or more Bluetooth devices.

The information about the already Bluetooth-connected one or more Bluetooth devices may include information about whether the already Bluetooth-connected one or more Bluetooth devices support USB connection. For example, a Bluetooth device may include information indicating that USB connection may be supported and another Bluetooth device may include information indicating that USB connection may not be supported.

The information about the already Bluetooth-connected one or more Bluetooth devices may include information indicating how much the already Bluetooth-connected one or more Bluetooth devices are relevant to a particular application. For example, the information about the already Bluetooth-connected one or more Bluetooth devices may include one or more of information indicating how much each of the already Bluetooth-connected one or more Bluetooth devices is relevant to a game application or information indicating how much each of the already Bluetooth-connected one or more Bluetooth devices is relevant to a video application.

The electronic device 100 may provide a user interface to select at least one Bluetooth device for which release of Bluetooth connection is possible among one or more Bluetooth devices to enable connection to the first device by referring to the information about the already Bluetooth-connected one or more Bluetooth devices as described above.

The electronic device 100 may provide a user interface to select at least one Bluetooth device for which release of Bluetooth connection is possible among the already Bluetooth-connected one or more Bluetooth devices, based on an order of having older connection points in time by referring to information about connection points in time of the already Bluetooth-connected one or more Bluetooth devices.

The electronic device 100 may provide a user interface to select at least one Bluetooth device for Bluetooth disconnection, based on an order of Bluetooth devices having Bluetooth bandwidth corresponding to or the most similar to the Bluetooth bandwidth of the first device by referring to information about bandwidth used by the already Bluetooth-connected one or more Bluetooth devices.

The electronic device 100 may provide a user interface to select at least one Bluetooth device for which release of Bluetooth connection is possible, based on an order of Bluetooth devices indicating that USB connection may be supported by referring to information about whether the already Bluetooth-connected one or more Bluetooth devices support USB connection.

The electronic device 100 may provide a user interface to select at least one Bluetooth device for which release of Bluetooth connection is possible, based on an order of having lower relevance to an application running in the electronic device 100 by referring to information indicating how much the already Bluetooth-connected one or more Bluetooth devices are relevant to the application. For example, when the application running in the electronic device 100 is a game application, the electronic device 100 may provide a user interface to select at least one Bluetooth device for which release of Bluetooth connection is possible in an order of having lower relevance to the game application among the already Bluetooth-connected one or more Bluetooth devices. For example, when the application running in the electronic device 100 is a video application, the electronic device 100 may provide a user interface to select at least one Bluetooth device for which release of Bluetooth connection is possible in an order of having lower relevance to the video application among the already Bluetooth-connected one or more Bluetooth devices.

In operation 650, the electronic device 100 may release Bluetooth connection to at least one Bluetooth device selected according to an input through the user interface.

In operation 660, as the available bandwidth of the electronic device 100 increases with the release of Bluetooth connection to at least one Bluetooth device to enable Bluetooth connection to the first device, the electronic device 100 may perform the operation of Bluetooth connection to the first device.

The electronic device 100 may recommend a Bluetooth device for Bluetooth disconnection based on an order of connection points in time among the already connected Bluetooth devices. This will be described in connection with FIGS. 10 to 12.

Figure 10:
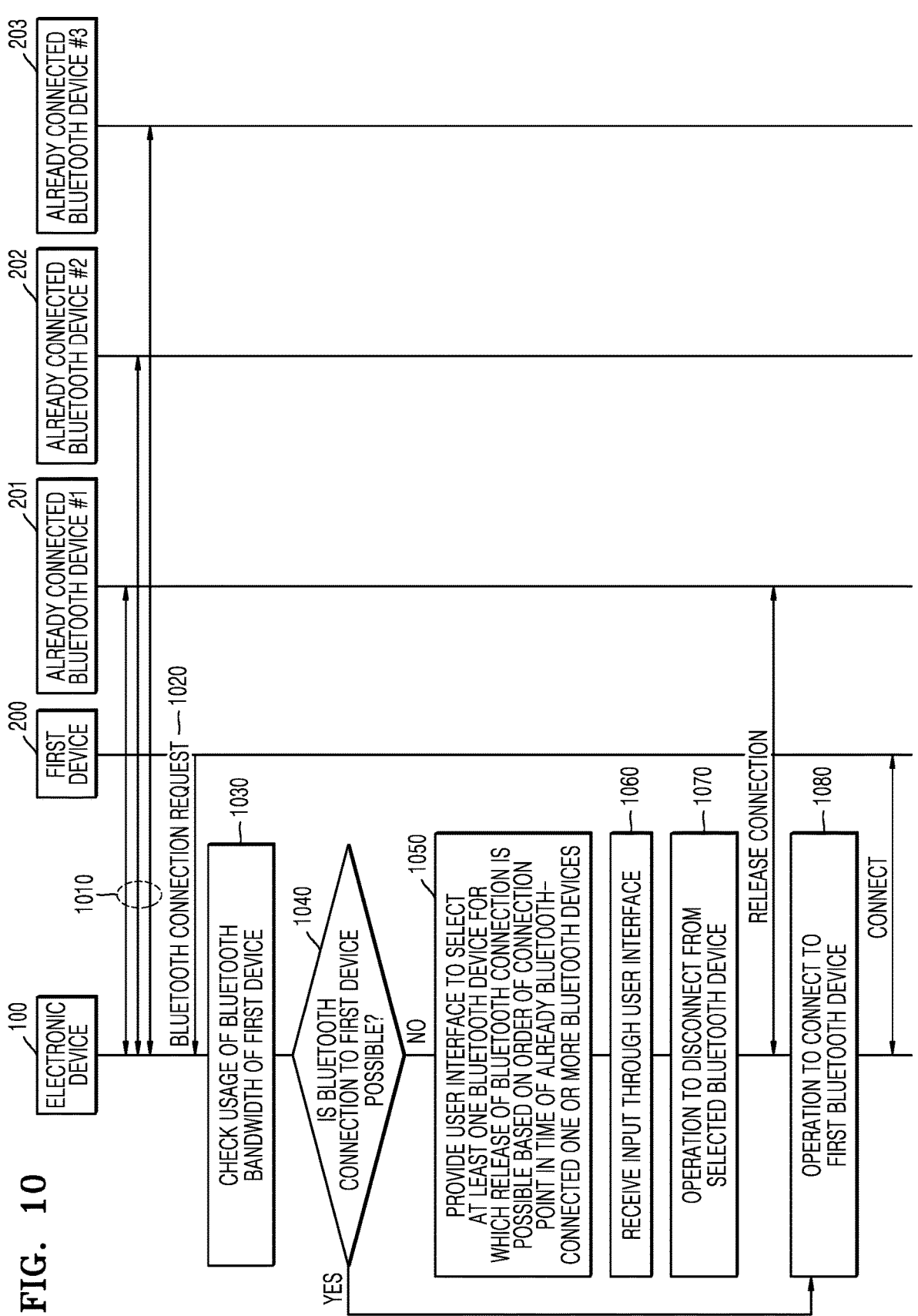
FIG. 10 is an example of a flowchart of a method of recommending one of already connected Bluetooth devices, for Bluetooth disconnection based on an order of connection points in time, according to an embodiment of the disclosure.

FIG. 10 is an example of a flowchart of a method of recommending one of already connected Bluetooth devices for Bluetooth disconnection based on an order of connection points in time, according to an embodiment of the disclosure.

Referring to FIG. 10, in operation 1010, the electronic device 100 may remain in a state of being connected to one or more Bluetooth devices. For example, the electronic device 100 may remain in a state of being Bluetooth-connected to Bluetooth #1, Bluetooth #2, ..., and Bluetooth device #N. The electronic device 100 may maintain the connected state once performing the connecting operation until performing a disconnection operation.

In operation 1020, the electronic device 100 may receive a Bluetooth connection request from the first device 200.

In operation 1030, the electronic device 100 may identify usage of Bluetooth bandwidth of the first device 200. Specifically, the electronic device 100 may identify usage of Bluetooth bandwidth of the first device required to perform Bluetooth communication with the first device.

The Bluetooth connection request received from the first device may include identification information of the first device. The electronic device 100 may store information about Bluetooth bandwidth required for each Bluetooth device. Accordingly, the electronic device 100 may identify the usage of Bluetooth bandwidth of the first device that has transmitted the Bluetooth connection request by referring to the identification information of the first device included in the Bluetooth connection request and information about Bluetooth bandwidth for each device stored.

The Bluetooth connection request received from the first device may further include manufacturer information as the identification information of the first device. The electronic device 100 may store information about Bluetooth bandwidth required for each device manufacturer of each Bluetooth device. Accordingly, the electronic device 100 may identify the usage of Bluetooth bandwidth of the first device that has transmitted the Bluetooth connection request by referring to the manufacturer information of the first device included in the Bluetooth connection request and information about Bluetooth bandwidth for each device manufacturer stored.

The Bluetooth connection request received from the first device may further include information about a function to be performed by the first device through Bluetooth communication. The electronic device 100 may store information about Bluetooth bandwidth for each function of each Bluetooth device. Accordingly, the electronic device 100 may identify the usage of Bluetooth bandwidth of the first device that has transmitted the Bluetooth connection request by referring to the function information of the first device included in the Bluetooth connection request and information about Bluetooth bandwidth for each function stored.

The electronic device 100 may store one or more of the bandwidth information for each Bluetooth device 700, the bandwidth information for each manufacturer of the Bluetooth device 800, and the bandwidth information for each function of the Bluetooth device 900.

In operation 1040, the electronic device 100 may determine whether Bluetooth connection to the first device 200 is possible.

The remaining bandwidth of the electronic device 100 may refer to a bandwidth obtained by excluding bandwidth used to connect to the already connected Bluetooth device(s) from the maximum Bluetooth bandwidth of the electronic device 100. For example, as shown in FIG. 3, the remaining bandwidth of the electronic device 100 may be remaining two slots obtained by excluding the bandwidth occupied by the already connected Bluetooth devices, i.e., 22 slots, from the maximum bandwidth, 24 slots, of the electronic device 100.

The electronic device 100 may determine the Bluetooth bandwidth of the first device that has transmitted the connection request as described in operation 620.

The electronic device 100 may compare the remaining bandwidth of the electronic device 100 with the Bluetooth bandwidth of the first device, and determine that connection for Bluetooth communication to the first device is possible when the remaining bandwidth of the electronic device 100 is equal to or greater than the Bluetooth bandwidth of the first device and determine that connection for Bluetooth communication to the first device is not possible when the remaining bandwidth of the electronic device 100 is less than the Bluetooth bandwidth of the first device.

The electronic device 100 may proceed to operation 1080 to perform an operation of Bluetooth connection to the first device when determining that Bluetooth connection to the first device is possible.

The electronic device 100 may proceed to operation 1050 when determining that Bluetooth connection to the first device is not possible.

In operation 1050, the electronic device 100 may provide a user interface to select at least one Bluetooth device for which release of Bluetooth connection is possible, based on an order of connection points in time of the already Bluetooth-connected one or more Bluetooth devices.

The electronic device 100 may store information about the already Bluetooth-connected one or more Bluetooth devices. The information about the already Bluetooth-connected one or more Bluetooth devices may include information about connection points in time between the electronic device 100 and the Bluetooth devices.

FIG. 11 illustrates an example of a list of Bluetooth devices connected to an electronic device, according to an embodiment of the disclosure.

Referring to FIG. 11, a list 1100 of Bluetooth devices may include identification information of one or more Bluetooth devices that remain in a state of being connected to the electronic device 100 and information about a connection point in time of each Bluetooth device. Referring to FIG. 11, connection points in time of Bluetooth devices are shown as 42 hours ago for the Bluetooth sound bar, 20 hours ago for the Bluetooth mike, 14 hours ago for the game controller 1, 3 hours ago for the game controller 2, and 2 hours ago for the game controller 3. Although the connection points in time are shown to indicate how many hours ago connections were made from now, it is not limited thereto. The connection point in time of each Bluetooth device may be represented in information about a time when the Bluetooth device is actually connected.

The electronic device 1100 may provide a user interface to select at least one Bluetooth device for which release of Bluetooth connection is possible, based on an order of connection points in time of the already Bluetooth-connected one or more Bluetooth devices by referring to the list 1100 of Bluetooth devices as shown in FIG. 11. In other words, the electronic device 100 may recommend the user at least one Bluetooth device for which release of Bluetooth connection is possible, in an order of having older connection points in time in the Bluetooth device list 1100.

Figure 12:
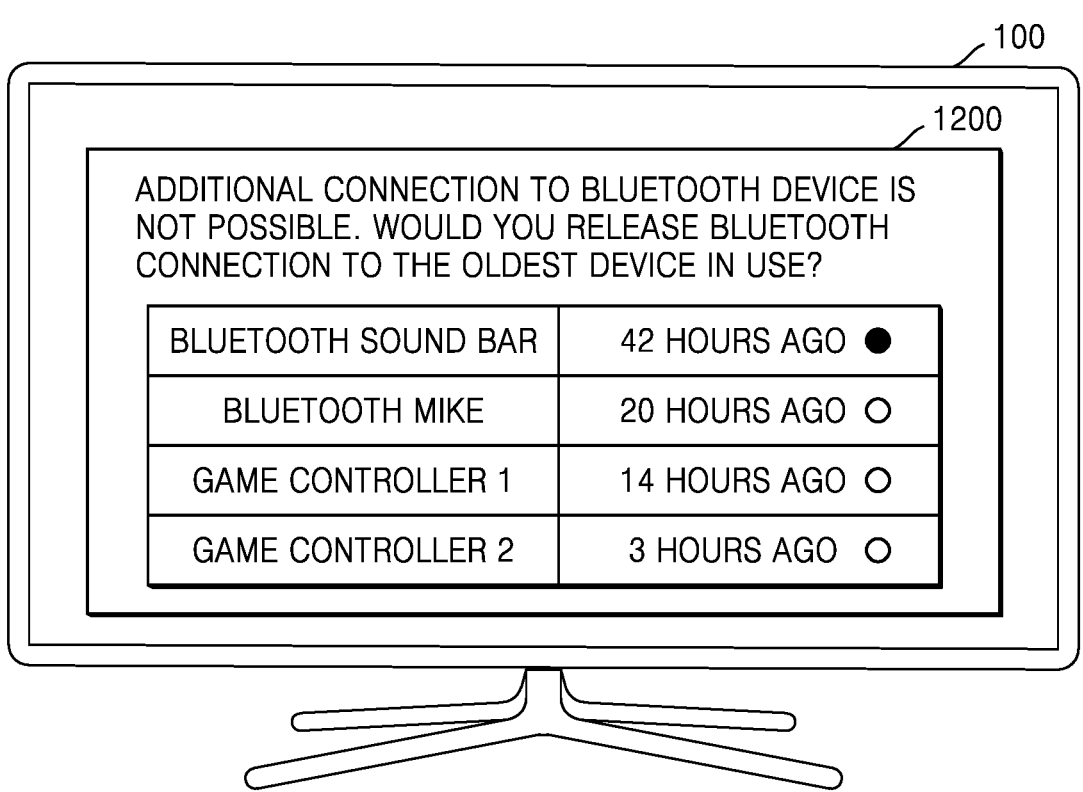
FIG. 12 is an example of a user interface for selecting at least one Bluetooth device, for which release of Bluetooth connection is possible, according to an embodiment of the disclosure.

FIG. 12 is an example of a user interface for selecting at least one Bluetooth device for which release of Bluetooth connection is possible, according to an embodiment of the disclosure.

Referring to FIG. 12, the electronic device 100 may recommend one or more Bluetooth devices in the Bluetooth device list stored in the electronic device 100, e.g., the Bluetooth device list 1100 as shown in FIG. 11 in an order of having older connection points in time as the device that may be selected for Bluetooth disconnection. Referring to FIG. 12, the user interface 1200 provided by the electronic device 100 may include information about connection points in time of one or more Bluetooth devices in an order of having older connection points in time, i.e., a Bluetooth sound bar, a Bluetooth mike, a game controller 1, and a game controller 2, along with a message like <connection to an additional Bluetooth device is not possible. Would you release Bluetooth connection of the oldest device?>.

The user may select one or more Bluetooth devices, Bluetooth connection of which is to be released, to correspond to the user interface 1200 output on the electronic device 100. For example, the user may select the Bluetooth sound bar that is the oldest connected device in the user interface 1200 as a Bluetooth device to be disconnected.

Turning back to FIG. 10, in operation 1060, the electronic device 100 may receive an input to select one or more Bluetooth devices, Bluetooth connection of which is to be released, through the user interface.

In operation 1070, the electronic device 100 may perform an operation of disconnecting the selected Bluetooth device. For example, when the Bluetooth device selected through the user interface is Bluetooth #1, the electronic device 100 may perform an operation to release Bluetooth connection to the Bluetooth #1.

In operation 1080, the electronic device 100 may perform an operation of connection to the first device 200.

As described above, the electronic device 100 may recommend the user to select the oldest device in use by providing information about Bluetooth devices based on use history and displaying a select item for the oldest device in use among them. The user may select the oldest device in use as recommended by the electronic device 100, or may move the select item to select a device intended by the user.

The electronic device 100 may provide device information based on the use history, and secure bandwidth by releasing connection to the selected device when the user selects the device. The electronic device 100 may use the secured bandwidth to perform an operation to connect a Bluetooth device to be newly connected.

The electronic device 100 may secure bandwidth in advance by periodically disconnecting the oldest devices in use. For example, the electronic device 100 may periodically check points in time at which Bluetooth-connected devices started to be used based on 5 days of use time, and perform an operation to release Bluetooth connection to devices that started to be used 5 days ago or more than 5 days ago. By doing such operations in advance, bandwidth for the device to be newly connected may be secured.

The electronic device 100 may recommend a Bluetooth device for Bluetooth disconnection, based on relevance to an application running in the electronic device 100 among the already connected Bluetooth devices. This will be described in connection with FIGS. 13 to 15.

Figure 13:
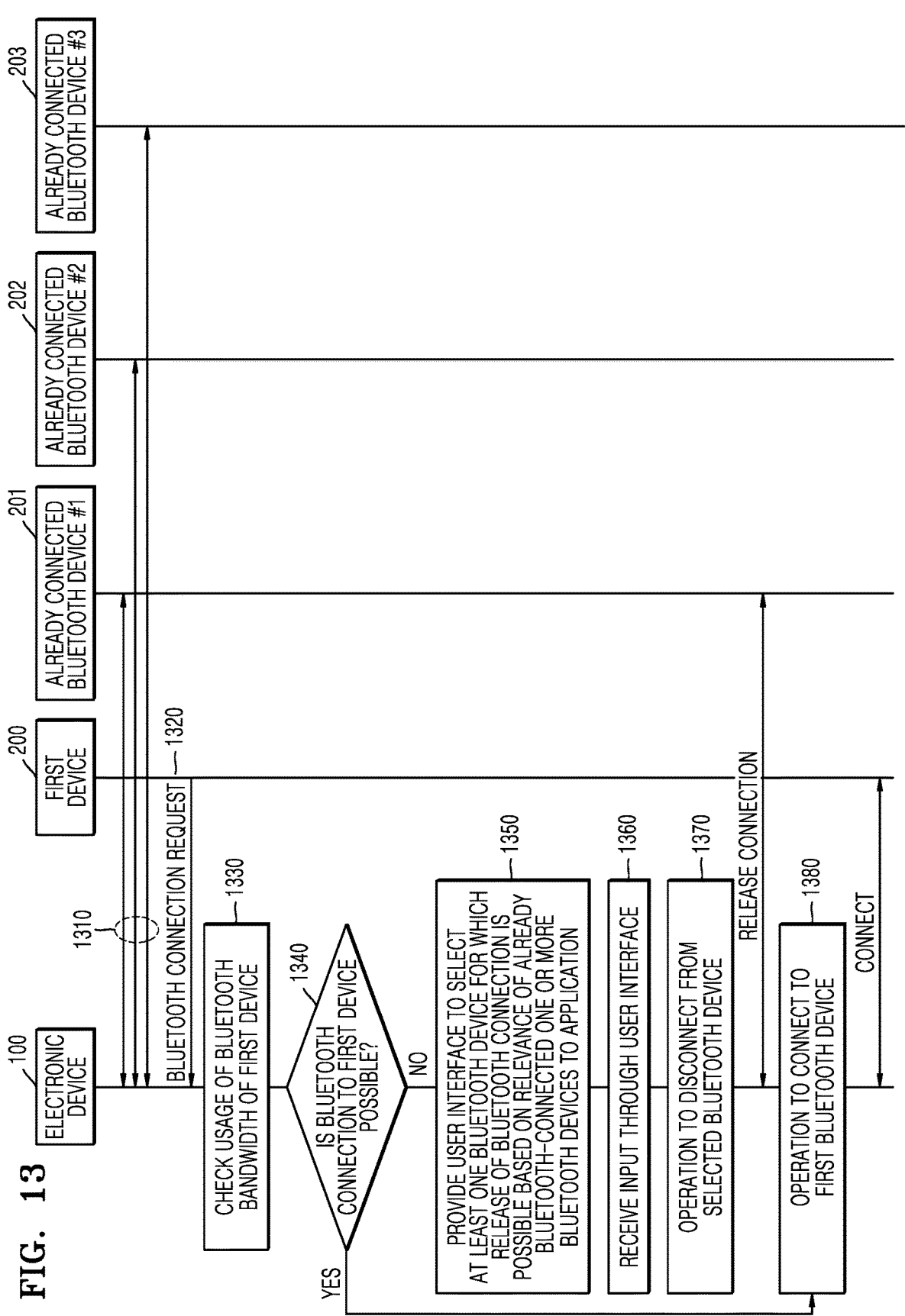
FIG. 13 is an example of a flowchart of a method of recommending a Bluetooth device among already connected Bluetooth devices for Bluetooth disconnection based on relevance to an application running in an electronic device, according to an embodiment of the disclosure.

FIG. 13 is an example of a flowchart of a method of recommending a Bluetooth device among already connected Bluetooth devices for Bluetooth disconnection based on relevance to an application running in an electronic device, according to an embodiment of the disclosure.

Referring to FIG. 13, in operation 1310, the electronic device 100 may remain in a state of being connected to one or more Bluetooth devices. In operation 1320, the electronic device 100 may receive a Bluetooth connection request from the first device 200.

In operation 1330, the electronic device 100 may identify usage of Bluetooth bandwidth of the first device 200.

In operation 1340, the electronic device 100 may determine whether Bluetooth connection to the first device 200 is possible.

The remaining bandwidth of the electronic device 100 may refer to a bandwidth obtained by excluding bandwidth used to connect to the already connected Bluetooth device(s) from the maximum Bluetooth bandwidth of the electronic device 100.

The electronic device 100 may compare the remaining bandwidth of the electronic device 100 with the Bluetooth bandwidth of the first device, and determine that connection for Bluetooth communication of the first device is possible when the remaining bandwidth of the electronic device 100 is equal to or greater than the Bluetooth bandwidth of the first device and determine that connection for Bluetooth communication of the first device is not possible when the remaining bandwidth of the electronic device 100 is less than the Bluetooth bandwidth of the first device.

The electronic device 100 may proceed to operation 1380 to perform an operation of Bluetooth connection to the first device when determining that Bluetooth connection to the first device is possible.

The electronic device 100 may proceed to operation 1350 when determining that Bluetooth connection to the first device is not possible.

In operation 1350, the electronic device 100 may provide a user interface to select at least one Bluetooth device for which release of Bluetooth connection is possible, based on relevance of the already Bluetooth-connected one or more Bluetooth devices to the application.

It may be desirable for the electronic device 100 to keep Bluetooth devices having high relevance to an application currently running in the electronic device 100 in the connected state if possible and to disconnect Bluetooth devices having low relevance to the application currently running in the electronic device 100. The Bluetooth devices having high relevance to the running application may refer to Bluetooth devices highly likely to be used with the running application. The Bluetooth devices having low relevance to the running application may refer to Bluetooth devices less likely to be used with the running application. For example, when the application running in the electronic device 100 is a game application, it may be desirable for the electronic device 100 to keep Bluetooth devices (e.g., game controllers) that may be used with the game application in the connected state if possible and to disconnect Bluetooth devices (e.g., a sound bar) less likely to be used with the game application. For example, when the application running in the electronic device 100 is a video application, it may be desirable for the electronic device 100 to keep Bluetooth devices (e.g., a sound bar) that may be used with the video application in the connected state if possible and to disconnect Bluetooth devices (e.g., a Bluetooth mike) less likely to be used with the video application.

The electronic device 100 may store information about the already Bluetooth-connected one or more Bluetooth devices. The information about the already Bluetooth-connected one or more Bluetooth devices may include information about relevance of the Bluetooth devices to the application.

FIG. 14 illustrates an example of a list of Bluetooth devices connected to an electronic device, according to an embodiment of the disclosure.

Referring to FIG. 14, the list of Bluetooth devices may include a list 1410 of Bluetooth connected devices that includes information about relevance to a game application and a list 1420 of Bluetooth connected devices that includes information about relevance to a video application.

The list 1410 of Bluetooth connected devices that includes information about relevance to the game application may include identification information of one or more Bluetooth devices that remain in a state of being connected to the electronic device 100 and information about relevance of each Bluetooth device to the game application. Referring to FIG. 14, relevance of each Bluetooth device to the game application is shown as 50% for the Bluetooth sound bar, 80% for the Bluetooth mike, 100% for the game controller 1, 100% for the game controller 2 and 100% for the game controller 3. The numerical values representing the relevance of each Bluetooth device to the game application may be determined or updated according to a policy of the electronic device 100.

The list 1420 of Bluetooth connected devices that includes information about relevance to the video application may include identification information of one or more Bluetooth devices that remain in a state of being connected to the electronic device 100 and information about relevance of each Bluetooth device to the video application. Referring to FIG. 14, relevance of each Bluetooth device to the video application is shown as 100% for the Bluetooth sound bar, 20% for the Bluetooth mike, 0% for the game controller 1, 0% for the game controller 2 and 0% for the game controller 3. The numerical values representing the relevance of each Bluetooth device to the video application may be determined or updated according to a policy of the electronic device 100.

The electronic device 100 may provide a user interface to select at least one Bluetooth device for which release of Bluetooth connection is possible, based on relevance of the already Bluetooth-connected one or more Bluetooth devices to an application by referring to the Bluetooth device list 1410 or 142 as shown in FIG. 14. In other words, the electronic device 100 may recommend the user at least one Bluetooth device for which release of Bluetooth connection is possible, in an order of having lower relevance to the application in the Bluetooth device list 1410 or 1420.

Figure 15:
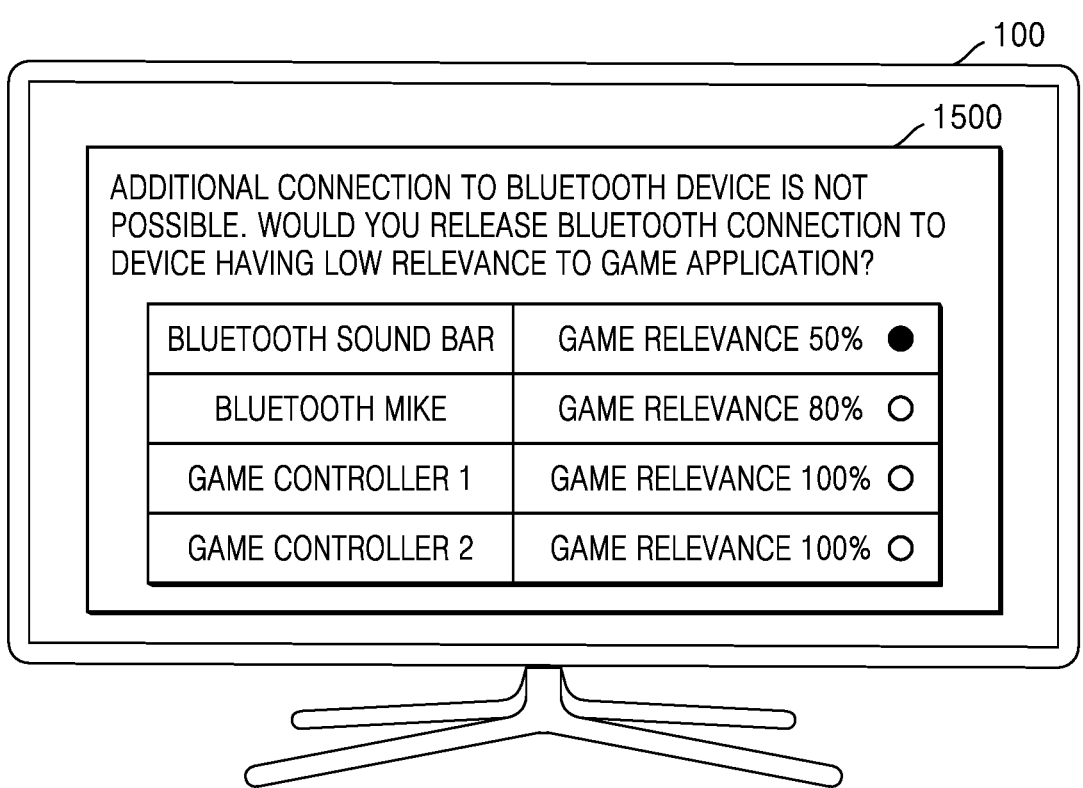
FIG. 15 is an example of a user interface for selecting at least one Bluetooth device, for which release of Bluetooth connection is possible, according to an embodiment of the disclosure.

FIG. 15 is an example of a user interface for selecting at least one Bluetooth device for which release of Bluetooth connection is possible, according to an embodiment of the disclosure.

Referring to FIG. 15, the electronic device 100 may identify an application running in the electronic device 100 and obtain a Bluetooth device list corresponding to the identified application. For example, when the application running in the electronic device 100 is a game application, the electronic device 100 may use the Bluetooth device list 1410 having game relevance information, and when the running application is a video application, the electronic device 100 may use the Bluetooth device list 1420 having video application relevance information. For example, one or more Bluetooth devices may be recommended to be selected as a device for Bluetooth disconnection, in an order of having lower relevance to the application in the Bluetooth device list 1410 or 1420 as shown in FIG. 14. For example, assume that an application currently running in the electronic device 100 is a game application. Referring to FIG. 15, the user interface 1500 provided by the electronic device 100 may include numerical values of game relevance of one or more Bluetooth devices having low relevance to the game application, i.e., the Bluetooth sound bar, the Bluetooth mike, the game controller 1, and the game controller 2, along with a message like <Additional connection to a Bluetooth device is not possible. Would you release Bluetooth connection of a device having low relevance to the game application?>.

The user may select one or more Bluetooth devices, Bluetooth connection of which is to be released, to correspond to the user interface 1500 output on the electronic device 100. For example, the user may select the Bluetooth sound bar having the lowest relevance to the game application in the user interface 1500 as a Bluetooth device to be disconnected.

Turning back to FIG. 13, in operation 1360, the electronic device 100 may receive an input through the user interface to select one or more Bluetooth devices, Bluetooth connection of which is to be released.

In operation 1370, the electronic device 100 performs an operation of disconnecting the selected Bluetooth device. For example, when the Bluetooth device selected through the user interface is Bluetooth #1, the electronic device 100 may perform an operation to release Bluetooth connection to the Bluetooth #1.

In operation 1380, the electronic device 100 may perform an operation of connection to the first device 200.

As such, when the user tries Bluetooth connection, the user may receive a recommendation to disconnect a low-relevant Bluetooth device depending on the type of a currently running application. When a game application is running, a game controller is highly relevant and when a multimedia play application is running, a speaker or a sound bar is highly relevant, so a device having low relevance is recommended for the user to disconnect the device first.

The electronic device 100 may store information about levels of relevance of associated devices to each application in advance. When an application is running, information about relevance of associated devices to the application may be used to recommend devices, Bluetooth connection of which is to be released, to the user. The electronic device 100 may provide device information based on the application relevance, and secure bandwidth for a Bluetooth device that has sent a new Bluetooth connection request by releasing connection to a device when the user selects the device.

The electronic device 100 may recommend a Bluetooth device for Bluetooth disconnection, based on whether universal serial bus (USB) connection is supported, among the already connected Bluetooth devices. This will be described in connection with FIGS. 16 to 18.

Figure 16:
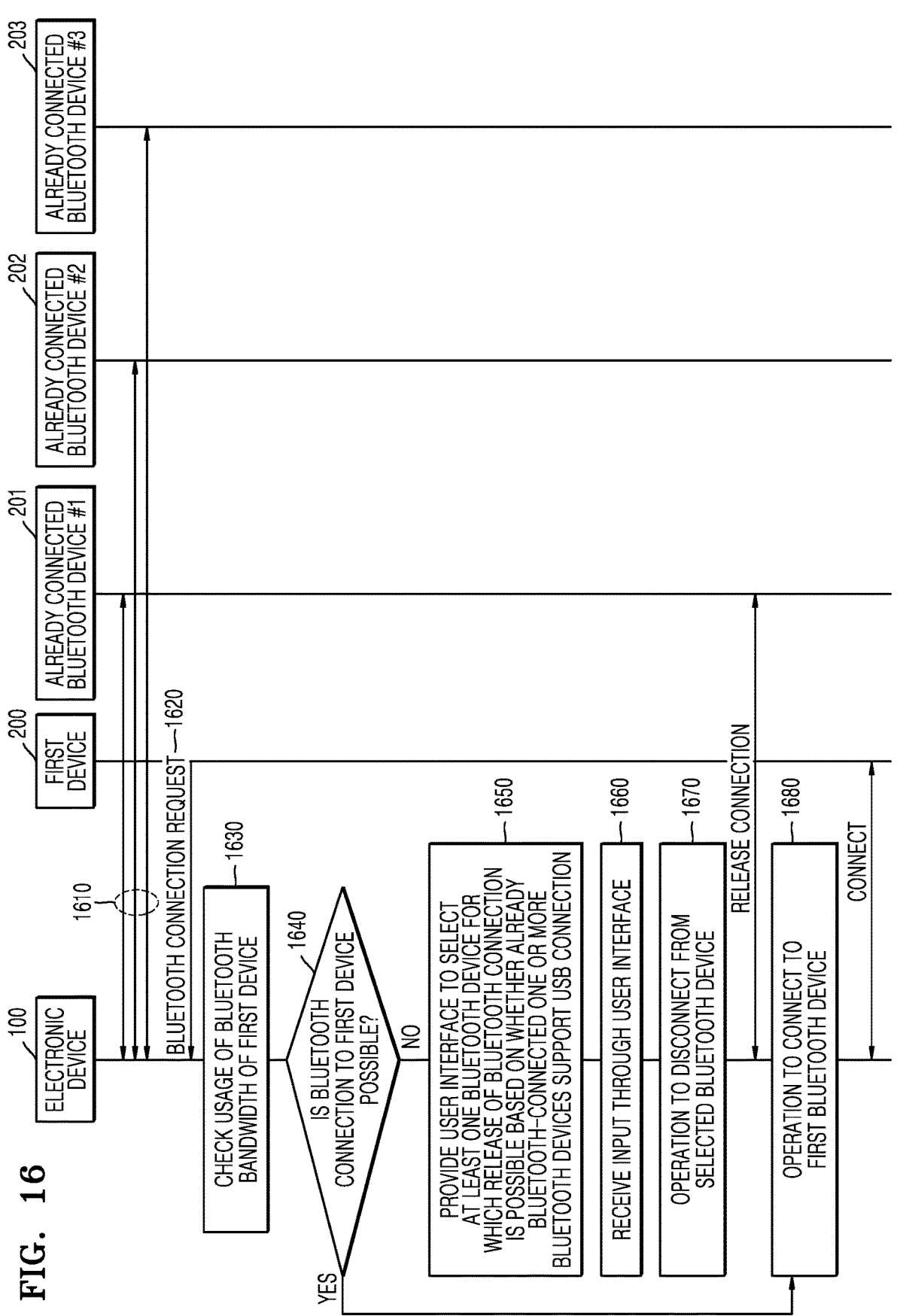
FIG. 16 is an example of a flowchart of a method of recommending a Bluetooth device among already connected Bluetooth devices for Bluetooth disconnection based on whether universal serial bus (USB) connection is supported, according to an embodiment of the disclosure.

FIG. 16 is an example of a flowchart of a method of recommending a Bluetooth device among already connected Bluetooth devices for Bluetooth disconnection based on whether USB connection is supported, according to an embodiment of the disclosure.

Referring to FIG. 16, in operation 1610, the electronic device 100 may remain in a state of being connected to one or more Bluetooth devices. In operation 1620, the electronic device 100 may receive a Bluetooth connection request from the first device 200.

In operation 1630, the electronic device 100 may identify usage of Bluetooth bandwidth of the first device 200.

In operation 1640, the electronic device 100 may determine whether Bluetooth connection to the first device 200 is possible.

The remaining bandwidth of the electronic device 100 may refer to a bandwidth obtained by excluding bandwidth used to connect to the already connected Bluetooth device(s) from the maximum Bluetooth bandwidth of the electronic device 100.

The electronic device 100 may compare the remaining bandwidth of the electronic device 100 with the Bluetooth bandwidth of the first device, and determine that connection for Bluetooth communication of the first device is possible when the remaining bandwidth of the electronic device 100 is equal to or greater than the Bluetooth bandwidth of the first device and determine that connection for Bluetooth communication of the first device is not possible when the remaining bandwidth of the electronic device 100 is less than the Bluetooth bandwidth of the first device.

The electronic device 100 may proceed to operation 1680 to perform an operation of Bluetooth connection to the first device when determining that Bluetooth connection to the first device is possible.

The electronic device 100 may proceed to operation 1650 when determining that Bluetooth connection to the first device is not possible.

In operation 1650, the electronic device 100 may provide a user interface to select at least one Bluetooth device for which release of Bluetooth connection is possible, based on whether the already Bluetooth-connected one or more Bluetooth devices support USB connection.

When there is a device that has already been connected to the electronic device 100 and also supports USB connection, the electronic device 100 may recommend the Bluetooth device that may support USB connection as a device to be Bluetooth-disconnected.

The electronic device 100 may store information about the already Bluetooth-connected one or more Bluetooth devices. The information about the already Bluetooth-connected one or more Bluetooth devices may include information about whether each Bluetooth device supports USB connection.

FIG. 17 illustrates an example of a list of Bluetooth devices connected to an electronic device, according to an embodiment of the disclosure.

Referring to FIG. 17, a list 1700 of Bluetooth devices may include identification information of one or more Bluetooth devices that remain in a state of being connected to the electronic device 100 and information about whether each Bluetooth device supports USB connection. Referring to FIG. 17, whether each Bluetooth device supports USB connection is shown as 'not supported' for the Bluetooth sound bar, 'supported' for the Bluetooth mike, 'not supported' for the game controller 1, 'supported' for the game controller 2 and 'not supported' for the game controller 3.

The electronic device 100 may provide a user interface to select at least one Bluetooth device for which release of Bluetooth connection is possible, based on whether the already Bluetooth-connected one or more Bluetooth devices support USB connection by referring to the Bluetooth device list 1700 as shown in FIG. 17. In other words, the electronic device 100 may recommend the user at least one Bluetooth device for which release of Bluetooth connection is possible, based on whether the device supports UBS connection in the Bluetooth device list 1700.

Figure 18:
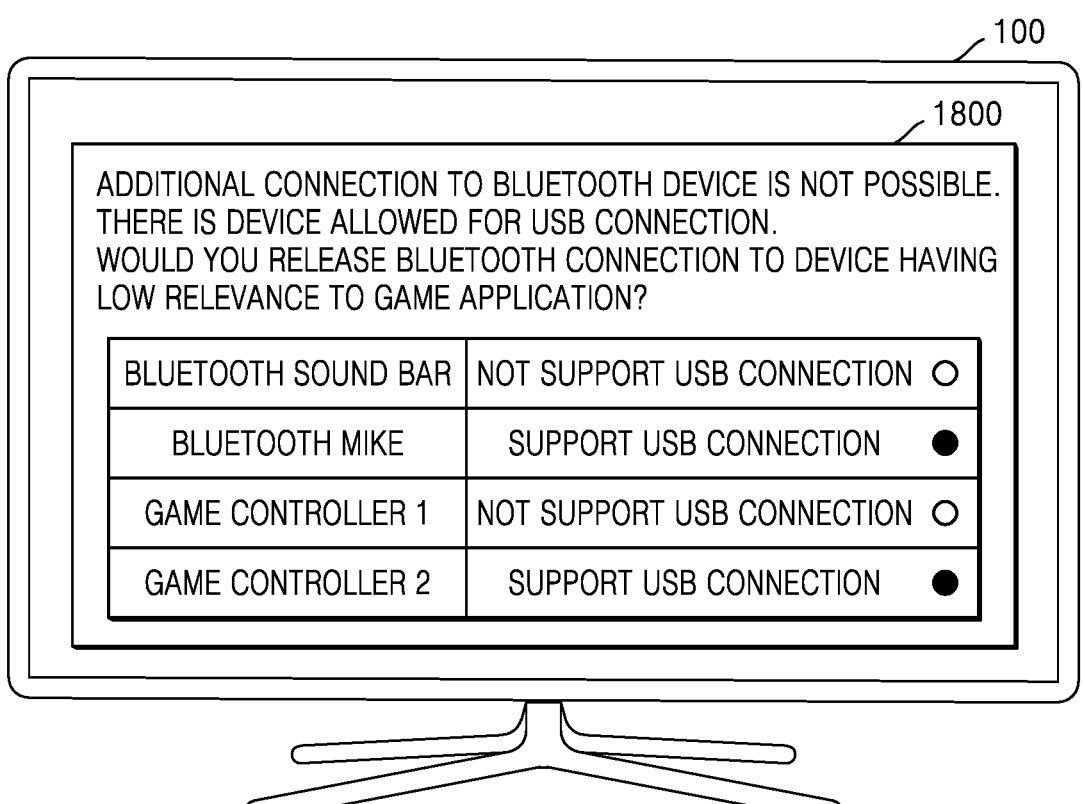
FIG. 18 is an example of a user interface for selecting at least one Bluetooth device for Bluetooth disconnection, according to an embodiment of the disclosure.

FIG. 18 is an example of a user interface for selecting at least one Bluetooth device for which release of Bluetooth connection is possible, according to an embodiment of the disclosure.

Referring to FIG. 18, the electronic device 100 may recommend one or more Bluetooth devices in e.g., the Bluetooth device list 1700 as shown in FIG. 17 as a device that may be selected for Bluetooth disconnection based on whether USB connection is supported. Referring to FIG. 18, the user interface 1800 provided by the electronic device 100 may display information about whether each Bluetooth device supports USB connection with a message like <Additional connection to a Bluetooth device is not possible. There is a device, USB connection of which is possible. Would you release Bluetooth connection to the device?>

The user may select one or more Bluetooth devices to be Bluetooth-disconnected to correspond to the user interface 1800 output on the electronic device 100. For example, the user may select one of the Bluetooth devices indicated as supporting USB connection as a device for Bluetooth disconnection in the user interface 1800.

Turning back to FIG. 16, in operation 1660, the electronic device 100 may receive an input to select one or more Bluetooth devices, Bluetooth connection of which is to be released, through the user interface.

In operation 1670, the electronic device 100 performs an operation of disconnecting the selected Bluetooth device. For example, when the Bluetooth device selected through the user interface is Bluetooth #1, the electronic device 100 may perform an operation to release Bluetooth connection to the Bluetooth #1.

In operation 1680, the electronic device 100 may perform an operation of connection to the first device 200.

As described above, the electronic device 100 may recommend the user to select a device that supports USB connection by providing information about Bluetooth devices along with whether they support USB connection and displaying a select item for a device which supports USB connection. When the user selects the Bluetooth mike, which is one of the devices that support USB connection, a TV may release Bluetooth connection to the Bluetooth mike and make USB connection to the Bluetooth mike. The bandwidth restored by releasing Bluetooth connection to the Bluetooth mike may be allocated for a Bluetooth bandwidth of a device that is currently trying Bluetooth connection to the TV.

The electronic device 100 may recommend a Bluetooth device for Bluetooth disconnection, based on the Bluetooth bandwidth of a device that requests new Bluetooth connection, among the already connected Bluetooth devices. This will be described in connection with FIGS. 19 to 21.

Figure 19:
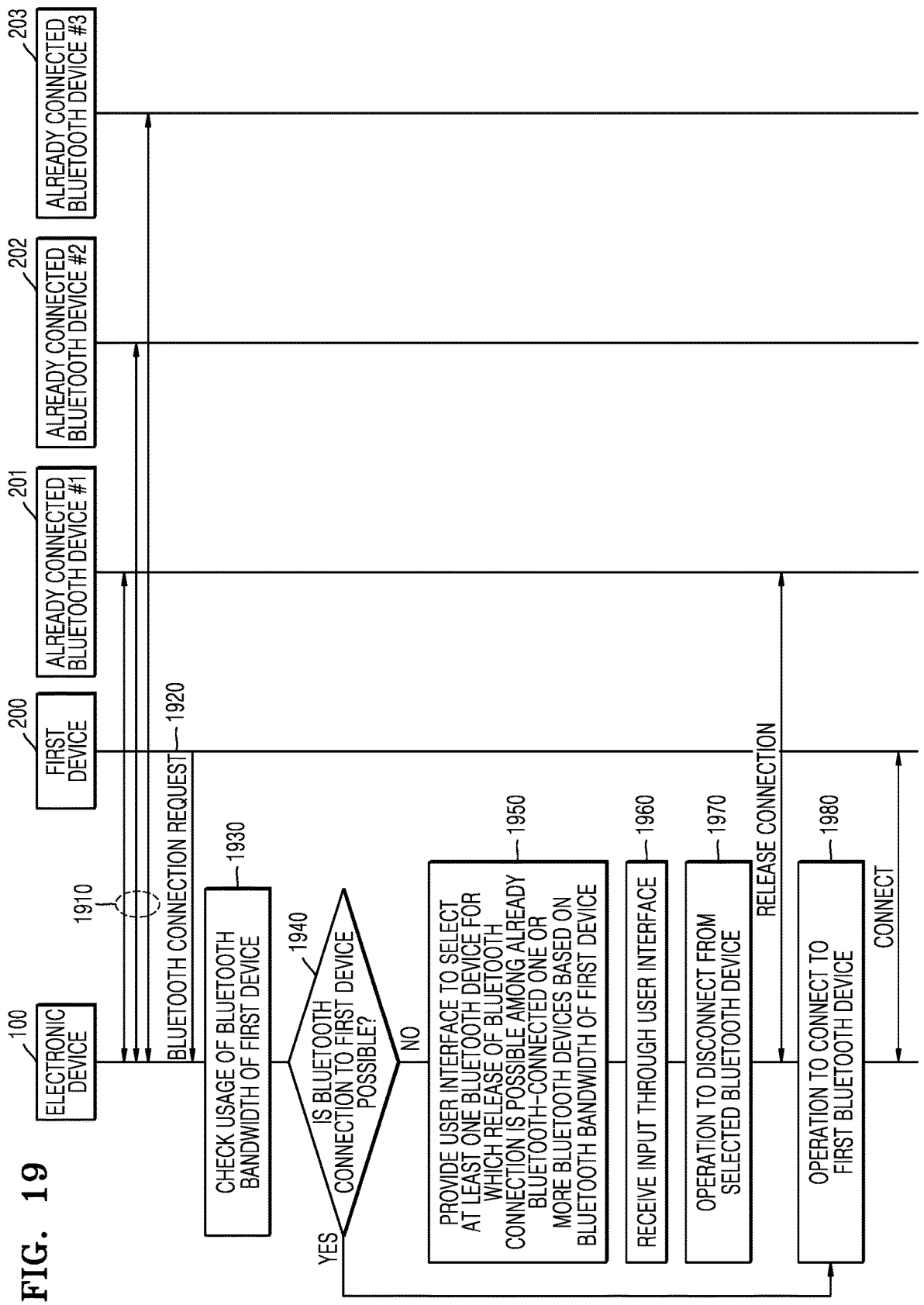
FIG. 19 is an example of a flowchart of a method of recommending a Bluetooth device among already connected Bluetooth devices for Bluetooth disconnection based on Bluetooth bandwidth of a first device, according to an embodiment of the disclosure.

FIG. 19 is an example of a flowchart of a method of recommending a Bluetooth device among already connected Bluetooth devices for Bluetooth disconnection based on Bluetooth bandwidth of a first device, according to an embodiment of the disclosure.

Referring to FIG. 19, in operation 1910, the electronic device 100 may remain in a state of being connected to one or more Bluetooth devices. In operation 1920, the electronic device 100 may receive a Bluetooth connection request from the first device 200.

In operation 1930, the electronic device 100 may identify usage of Bluetooth bandwidth of the first device 200.

In operation 1940, the electronic device 100 may determine whether Bluetooth connection to the first device 200 is possible.

The remaining bandwidth of the electronic device 100 may refer to a bandwidth obtained by excluding bandwidth used to connect to the already connected Bluetooth device(s) from the maximum Bluetooth bandwidth of the electronic device 100.

The electronic device 100 may compare the remaining bandwidth of the electronic device 100 with the Bluetooth bandwidth of the first device, and determine that connection for Bluetooth communication of the first device is possible when the remaining bandwidth of the electronic device 100 is equal to or greater than the Bluetooth bandwidth of the first device and determine that connection for Bluetooth communication of the first device is not possible when the remaining bandwidth of the electronic device 100 is less than the Bluetooth bandwidth of the first device.

The electronic device 100 may proceed to operation 1980 to perform an operation of Bluetooth connection to the first device when determining that Bluetooth connection to the first device is possible.

The electronic device 100 may proceed to operation 1950 when determining that Bluetooth connection to the first device is not possible.

In operation 1950, the electronic device 100 may provide a user interface to select at least one Bluetooth device for which release of Bluetooth connection is possible, based on the Bluetooth bandwidth of the first device, among the already Bluetooth-connected one or more Bluetooth devices.

The electronic device 100 may recommend a Bluetooth device that uses a bandwidth corresponding to the Bluetooth bandwidth of the first device that requests Bluetooth connection, e.g., a Bluetooth device that uses the most similar bandwidth, as a device, Bluetooth connection of which is to be released.

The electronic device 100 may store information about the already Bluetooth-connected one or more Bluetooth devices. The information about the already Bluetooth-connected one or more Bluetooth devices may include information about a bandwidth used by each Bluetooth device.

FIG. 20 illustrates an example of a list of Bluetooth devices connected to an electronic device, according to an embodiment of the disclosure.

Referring to FIG. 20, a list 2000 of Bluetooth devices may include identification information of one or more Bluetooth devices that remain in a state of being connected to the electronic device 100 and information about usage of bandwidth of each Bluetooth device. Referring to FIG. 20, the usage of bandwidth of each Bluetooth device is shown as 25 for the Bluetooth sound bar, 15 for the Bluetooth mike, 40 for the game controller 1, 30 for the game controller 2 and 50 for the game controller 3.

The electronic device 100 may provide a user interface to select at least one Bluetooth device for which Bluetooth connection is to be released, based on the bandwidth used by the already Bluetooth-connected one or more Bluetooth devices by referring to the Bluetooth device list 2000 as shown in FIG. 20. In other words, the electronic device 100 may recommend the user at least one Bluetooth device for which Bluetooth connection is to be released, based on the usage of bandwidth of the first device in the Bluetooth device list 2000.

Figure 21:
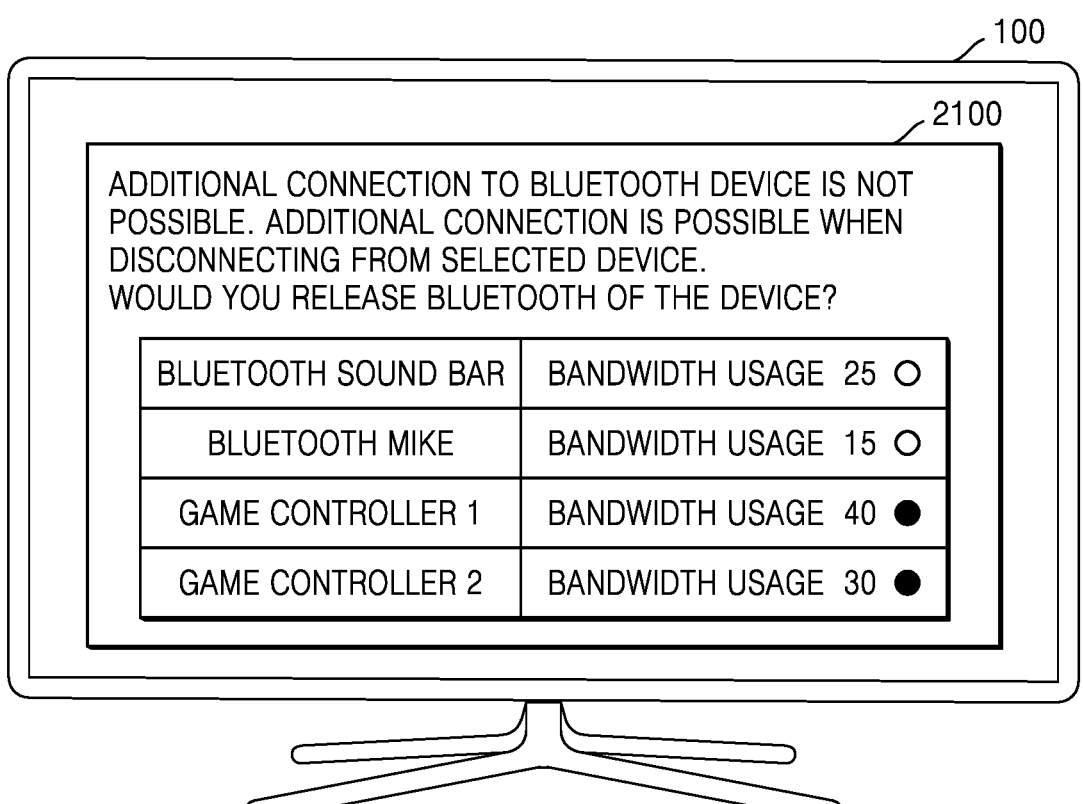
FIG. 21 is an example of a user interface for selecting at least one Bluetooth device for Bluetooth disconnection, according to an embodiment of the disclosure.

FIG. 21 is an example of a user interface for selecting at least one Bluetooth device for release of Bluetooth connection is possible, according to an embodiment of the disclosure.

Referring to FIG. 21, the electronic device 100 may recommend one or more Bluetooth devices in e.g., the Bluetooth device list 2000 as shown in FIG. 20 as the device that may be selected for Bluetooth disconnection based on the bandwidth usage. For example, when the usage of Bluetooth bandwidth of the first device that requests Bluetooth connection is 30, the user interface 2100 provided by the electronic device 100 as shown in FIG. 21 may display information about usage of bandwidth of each Bluetooth device with a message like <Additional connection to a Bluetooth device is not possible. New connection is possible after the selected device is disconnected. Would you release Bluetooth connection to the device?>. In this case, the game controller 1 and the game controller 2 having the most similar usage of Bluetooth bandwidth to that of the first device may be provided with select items. The user may move the select items.

The user may select one or more Bluetooth devices to be Bluetooth-disconnected to correspond to the user interface 2100 output on the electronic device 100. For example, the user may select one of the Bluetooth devices displayed in the user interface 2100 as a device for which Bluetooth connection is to be released.

Turning back to FIG. 19, in operation 1960, the electronic device 100 may receive an input to select one or more Bluetooth devices, Bluetooth connection of which is to be released, through the user interface.

In operation 1970, the electronic device 100 may perform an operation of disconnecting the selected Bluetooth device. For example, when the Bluetooth device selected through the user interface is Bluetooth #1, the electronic device 100 may perform an operation to release Bluetooth connection to the Bluetooth #1.

In operation 1980, the electronic device 100 may perform an operation of connection to the first device 200.

As such, the electronic device 100 may recommend the user to select a device having a similar bandwidth by providing information about usage of bandwidth of each device and displaying a select item for a device of them having the most similar bandwidth to the bandwidth of a device that is currently trying connection. The user may select the game controller 2, which is a device having the most similar bandwidth to the device for connection, and accordingly, the TV may secure a bandwidth for the first device that requests Bluetooth connection by releasing Bluetooth connection to the game controller 2.

The electronic device 100 may store information about priorities of devices, for which Bluetooth connection is to be released, when it is difficult to make Bluetooth connection due to the lack of Bluetooth bandwidth, among already connected Bluetooth devices after receiving the information from the user, and may release Bluetooth connection according to the user-defined information when disconnection is needed.

As described above, release of connection to the existing device is recommended by predicting the usage of bandwidth of a device that sends a connection request, and Bluetooth connection to a new device may be allowed by securing as much bandwidth as required.

A method of operating an electronic device may be implemented in program instructions which are executable by various computing means and recorded in computer-readable media. Furthermore, A computer-readable recording medium having one or more programs including instructions to perform a method of operating an electronic device recorded thereon may be provided.

The computer-readable media may include program instructions, data files, data structures, etc., separately or in combination. The program instructions recorded on the computer-readable media may be designed and configured specially, or may be well-known to those of ordinary skill in the art of computer software. Examples of the computer readable recording medium include magnetic media including hard disks, magnetic tapes, and floppy disks, optical media including CD-ROMs, and DVDs, magneto-optical media including floptical disks, and a hardware apparatus designed to store and execute the programmed commands in read-only memory (ROM), random-access memory (RAM), and/or flash memories. Examples of the program instructions include not only machine language codes but also high-level language codes which are executable by various computing means using an interpreter.

The machine-readable storage medium may be provided in the form of a non-transitory storage medium. The term 'non-transitory storage medium' may mean a tangible device without including a signal, e.g., electromagnetic waves, and may not distinguish between storing data in the storage medium semi-permanently and temporarily. For example, the non-transitory storage medium may include a buffer that temporarily stores data.

A method of operating an electronic device may be provided in a computer program product. The computer program product may be a commercial product that may be traded between a seller and a buyer. The computer program product may be distributed in the form of a storage medium (e.g., a CD-ROM), through an application store (e.g., Play Store™), directly between two user devices (e.g., smart phones), or online (e.g., downloaded or uploaded). In the case of online distribution, at least part of the computer program product (e.g., a downloadable app) may be at least temporarily stored or arbitrarily generated in a storage medium that may be readable to a device such as a server of the manufacturer, a server of the application store, or a relay server.

Specifically, a computer program product including a recording medium having a program stored thereon to perform a method of operating an electronic device may be implemented.

Several disclosed embodiments have been described, but it will be understood that various modifications can be made without departing the scope of the disclosed embodiments. Thus, it will be apparent to those ordinary skilled in the art that the disclosed embodiments are not limited to the embodiments described, but can encompass not only the appended claims but the equivalents.

The invention claimed is:

1. An electronic device comprising:

a communicator;

a memory configured to store one or more instructions; and a processor configured to execute the one or more instructions stored in the memory to:

receive a request for wireless connection from a first device, identify a usage of a wireless bandwidth of the first device, determine whether a wireless connection to the first device is possible based on a remaining wireless bandwidth of the electronic device and the usage of the wireless bandwidth of the first device, in response to determining that the wireless connection to the first device is not possible based on the remaining wireless bandwidth of the electronic device and the usage of the wireless bandwidth of the first device, provide to a display a user interface that recommends at least one recommended device to be disconnected based on predetermined criteria and allows a user to select at least one other wireless device to be released from an other device wireless connection, from among one or more other wireless devices that are already wirelessly-connected to the electronic device with the other device wireless connection, release the other device wireless connection to the at least one other wireless device that is selected according to an input through the user interface, and in response to releasing the other device wireless connection, establish the wireless connection to the first device.

2. The electronic device of claim 1, wherein the processor is further configured to execute the one or more instructions to identify the usage of the wireless bandwidth of the first device includes instructions to identify based on at least one of manufacturer information of the first device, information about a wireless function requested by the first device, or information about the wireless bandwidth requested by the first device.

3. The electronic device of claim 1, wherein the processor is further configured to execute the one or more instructions to calculate the remaining wireless bandwidth of the electronic device by excluding bandwidth used by the one or more other wireless devices that are already wirelessly-connected to the electronic device from an available bandwidth of the electronic device.

4. The electronic device of claim 1, wherein the processor is further configured to execute the one or more instructions to:

determine that the wireless connection to the first device is possible when the remaining wireless bandwidth of the electronic device is greater than or equal to the usage of the wireless bandwidth of the first device, and determine that the wireless connection to the first device is not possible when the remaining wireless bandwidth of the electronic device is less than the usage of the wireless bandwidth of the first device.

5. The electronic device of claim 1, wherein the processor is further configured to execute the one or more instructions to recommend, through the user interface, release of the other device wireless connection to the at least one recommended device of the one or more other wireless devices based on an order of a duration of the other device wireless connection for each of the one or more other wireless devices that are already wirelessly-connected to the electronic device.

6. The electronic device of claim 1, wherein the processor is further configured to execute the one or more instructions to periodically release the other device wireless connection to any of the one or more other wireless devices based on a duration of the other device wireless connection for any of the one or more other devices being older than a predetermined threshold.

7. The electronic device of claim 1, wherein the processor is further configured to execute the one or more instructions to recommend, through the user interface, release of the other device wireless connection to the at least one recommended device of the one or more other wireless devices based on how relevant the one or more other wireless devices are to an application running in the electronic device.

8. The electronic device of claim 1, wherein the processor is further configured to execute the one or more instructions to recommend, through the user interface, release of the other device wireless connection to the at least one recommended device of the one or more other wireless devices based on an order of the other wireless devices having usages corresponding to the usage of the wireless bandwidth of the first device.

9. The electronic device of claim 1, wherein the processor is further configured to execute the one or more instructions to recommend, through the user interface, release of the other device wireless connection to the at least one recommended device of the one or more other wireless devices which supports USB connection to the electronic device.

10. The electronic device of claim 1, wherein the request for wireless connection is a request for Bluetooth connection, wherein the usage of the wireless bandwidth of the first device is a usage of a Bluetooth bandwidth of the first device, wherein the wireless connection to the first device is a Bluetooth connection to the first device, wherein the remaining wireless bandwidth of the electronic device is a remaining Bluetooth bandwidth of the electronic device, wherein the at least one other wireless device of the one or more other wireless devices is at least one other Bluetooth device of one or more other Bluetooth devices, and wherein the other device wireless connection is other device Bluetooth connection.

11. The electronic device of claim 1, wherein the processor is further configured to execute the one or more instructions to:

identify an application being executed by the electronic device, and provide to the display the user interface that recommends at least one recommended device to be disconnected based on a type of the application being executed.

12. An operating method of an electronic device, the operating method comprising:

receiving a request for wireless connection from a first device;

identifying a usage of a wireless bandwidth of the first device;

determining whether a wireless connection to the first device is possible based on a remaining wireless bandwidth of the electronic device and the usage of the wireless bandwidth of the first device;

in response to the determining that the wireless connection to the first device is not possible based on the remaining wireless bandwidth of the electronic device and the usage of the wireless bandwidth of the first device, provide a user interface to a display that recommends at least one recommended device to be disconnected based on predetermined criteria and allows a user to select at least one other wireless device to be released from an other device wireless connection, from among one or more other wireless devices that are already wirelessly-connected to the electronic device with the other device wireless connection;

releasing the other device wireless connection to the at least one other device that is selected according to an input through the user interface; and in response to releasing the other device wireless connection, establishing the wireless connection to the first device.

13. The operating method of claim 12, wherein the identifying the usage of the wireless bandwidth of the first device comprises identifying based on at least one of manufacturer information of the first device, information about a wireless function requested by the first device, or information about the wireless bandwidth requested by the first device.

14. The operating method of claim 12, further comprising:

calculating the remaining wireless bandwidth of the electronic device by excluding bandwidth used by the one or more other wireless devices that are already wirelessly-connected to the electronic device from an available bandwidth of the electronic device.

15. The operating method of claim 12, further comprising:

determining that the wireless connection to the first device is possible when the remaining wireless bandwidth of the electronic device is equal to or greater than the usage of the wireless bandwidth of the first device; and determining that the wireless connection to the first device is not possible when the remaining wireless bandwidth of the electronic device is less than the usage of the wireless bandwidth of the first device.

16. The operating method of claim 12, further comprising:

recommending, through the user interface, release of the other device wireless connection to the at least one recommended device of the one or more other wireless devices based on an order of a duration of the other device wireless connection for each of the one or more other devices that are already wirelessly-connected to the electronic device.

17. The operating method of claim 12, further comprising:

periodically releasing the other device wireless connection to any of the one or more other wireless devices based on a duration of the other device wireless connection for any of the one or more other devices being older than a predetermined threshold.

18. The operating method of claim 12, further comprising:

recommending, through the user interface, release of the other device wireless connection to the at least one recommended device of the one or more other wireless devices based on how relevant the one or more other wireless devices are to an application running in the electronic device.

19. The operating method of claim 12, further comprising:

recommending, through the user interface, release of the other device wireless connection to the at least one recommended device of the one or more other wireless devices based on an order of the other wireless devices having usages corresponding to the usage of the wireless bandwidth of the first device.

20. The operating method of claim 12, further comprising:

recommending, through the user interface, release of the other device wireless connection to the at least one recommended device of the one or more other wireless devices which supports USB connection to the electronic device.

21. The operating method of claim 12, wherein the request for wireless connection is a request for Bluetooth connection, wherein the usage of the wireless bandwidth of the first device is a usage of a Bluetooth bandwidth of the first device, wherein the wireless connection to the first device is a Bluetooth connection to the first device, wherein the remaining wireless bandwidth of the electronic device is a remaining Bluetooth bandwidth of the electronic device, wherein the at least one other wireless device of the one or more other wireless devices is at least one other Bluetooth device of one or more other Bluetooth devices, and wherein the other device wireless connection is other device Bluetooth connection.

22. A non-transitory computer-readable recording medium having a program stored therein that, when executed by at least one processor, performs an operating method comprising:

receiving a request for wireless connection from a first device;

identifying a usage of a wireless bandwidth of the first device;

determining whether a wireless connection to the first device is possible based on a remaining wireless bandwidth of the electronic device and the usage of the wireless bandwidth of the first device;

in response to the determining that the wireless connection to the first device is not possible based on the remaining wireless bandwidth of the electronic device and the usage of the wireless bandwidth of the first device, provide a user interface to a display that that recommends at least one recommended device to be disconnected based on predetermined criteria and allows a user to select at least one other wireless device to be released from an other device wireless connection, from among one or more other wireless devices that are already wirelessly-connected to the electronic device with the other device wireless connection;

releasing the other device wireless connection to the at least one other device that is selected according to an input through the user interface; and in response to releasing the other device wireless connection, establishing the wireless connection to the first device.

23. The non-transitory computer-readable recording medium of claim 22, wherein the request for wireless connection is a request for Bluetooth connection, wherein the usage of the wireless bandwidth of the first device is a usage of a Bluetooth bandwidth of the first device, wherein the wireless connection to the first device is a Bluetooth connection to the first device, wherein the remaining wireless bandwidth of the electronic device is a remaining Bluetooth bandwidth of the electronic device, wherein the at least one other wireless device of the one or more other wireless devices is at least one other Bluetooth device of one or more other Bluetooth devices, and wherein the other device wireless connection is other device Bluetooth connection.

* * * * *